(12) United States Patent
Nishii

(10) Patent No.: US 12,075,007 B2
(45) Date of Patent: Aug. 27, 2024

(54) IMAGE OUTPUT APPARATUS AND IMAGE OUTPUT METHOD PERFORMING SETTING BY DISPLAYING RESPECTIVE SETTING ITEMS IN MULTIPLE SETTING SCREENS

(71) Applicant: SHARP KABUSHIKI KAISHA, Sakai (JP)

(72) Inventor: Yuichi Nishii, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/200,601

(22) Filed: May 23, 2023

(65) Prior Publication Data
US 2023/0388424 A1    Nov. 30, 2023

(30) Foreign Application Priority Data
May 31, 2022   (JP) ................. 2022-088679

(51) Int. Cl.
*H04N 1/00*    (2006.01)

(52) U.S. Cl.
CPC ..... *H04N 1/00087* (2013.01); *H04N 1/00801* (2013.01); *H04N 1/00824* (2013.01); *H04N 1/00838* (2013.01)

(58) Field of Classification Search
USPC ........................................................ 358/401
See application file for complete search history.

(56) References Cited

U.S. PATENT DOCUMENTS

| 10,812,676 | B2 * | 10/2020 | Kakutani | H04N 1/00344 |
| 11,113,015 | B2 * | 9/2021 | Sato | G06F 3/1222 |
| 2005/0123209 | A1 | 6/2005 | Kitora et al. | |

FOREIGN PATENT DOCUMENTS

JP    2005-167937 A    6/2005

* cited by examiner

*Primary Examiner* — Jacky X Zheng
(74) *Attorney, Agent, or Firm* — ScienBiziP, P.C.

(57) ABSTRACT

An image output apparatus includes a controller that controls display of a first setting screen including setting items of a system to be used for a setting of operation of the image output apparatus and a second setting screen including setting items of a job to be used in a setting of operation in job execution, and an image outputter that outputs an image by executing a job based on the setting of the operation in the job execution. The controller disables a selection of the setting items of the job that uses a specific function on the second setting screen when use of the specific function is prohibited on the first setting screen.

10 Claims, 24 Drawing Sheets

FIG. 5A

| SETTING ITEMS | SETTING VALUES |
|---|---|
| JOB MODE | e-mail scan |
| FORMAT | PDF |
| OCR | ON |
| RESOLUTION | 400 dpi |
| COMPRESSION RATE | MEDIUM |
| ENCRYPTION | OFF |
| FILE BY PAGE | OFF |
| ⋮ | ⋮ |

FIG. 5B

| SETTING ITEMS | SETTING VALUES |
|---|---|
| ⋮ | ⋮ |
| PROHIBITION OF TRANSMISSION FROM PC-FAX | OFF |
| PROHIBITION OF SEARCH FOR MY ADDRESS | OFF |
| PROHIBITIONI OF OCR | OFF |
| ⋮ | ⋮ |

FIG. 5C

| FORMAT | OCR |
|---|---|
| ⋮ | ⋮ |
| JPEG | × |
| PDF/A-1a | ○ |
| ⋮ | ⋮ |
| DOCX | ○ |
| ⋮ | ⋮ |

FIG. 12

| STATUS | ADDRESS BOOK | FILE OPERATION | USER MANAGEMENT | SYSTEM SETTING |

FAX/IMAGE TRANSMISSION SETTING
COMMON SETTING
BASIC SETTING
PROHIBITION SETTING
SCANNER SETTING
STANDARD STATE SETTING
REGISTRATION OF TRANSMISSION SOURCE

SETTING OF STANDARD FILE FORMAT

COMMON IN SCANNERS:
FILE FORMAT: [PDF ▼]

☑ OCR (CHARACTER RICOGNITION):
MONOCHROME:
 COMPRESSION FORMAT: [MMR (G4) ▼]
 COMPRESSION RATE: [MIDDLE ▼]
COLOR/GRAYSCALE:
 ☐ EMPHASIZE BLACK TEXT
 PAGE COUNT: [    ] (1-99)

☐ FILE BY PAGE

OCR SETTING:
FONT:
 WESTERN LANGUAGES: [Arial ▼]
 JAPANESE: [MS GOTHIC ▼]
 SIMPLIFIED CHINESE: [SimSun ▼]
 TRADITIONAL CHINESE: [MingLiU ▼]
 KOREAN: [Dotum ▼]

E-mail:
FILE FORMAT: [PDF ▼]

[REGISTER] [UPDATE]                    [PAGE TOP]

FIG. 18

SETTING OF STANDARD FILE FORMAT

COMMON IN SCANNERS:
FILE FORMAT: PDF

☐ OCR (CHARACTER RECOGNITION)

MONOCHROME:
COMPRESSION FORMAT: MMR (G4)
COMPRESSION RATE: MIDDLE

COLOR/GRAYSCALE:
☐ EMPHASIZE BLACK TEXT

☐ FILE BY PAGE
PAGE COUNT: (1-99)

OCR SETTING
FONT:
WESTERN LANGUAGES: Arial
JAPANESE: MS GOTHIC
SIMPLIFIED CHINESE: SimSun
TRADITIONAL CHINESE: MingLiU
KOREAN: Dotum E-mail:
FILE FORMAT: PDF

[REGISTER] [UPDATE]

Tabs: STATUS | ADDRESS BOOK | FILE OPERATION | USER MANAGEMENT | SYSTEM SETTING

Side menu:
- FAX/IMAGE TRANSMISSION SETTING
- COMMON SETTING
  - BASIC SETTING
  - PROHIBITION SETTING
  - SCANNER SETTING
  - STANDARD STATE SETTING
  - REGISTRATION OF TRANSMISSION SOURCE

[PAGE TOP]

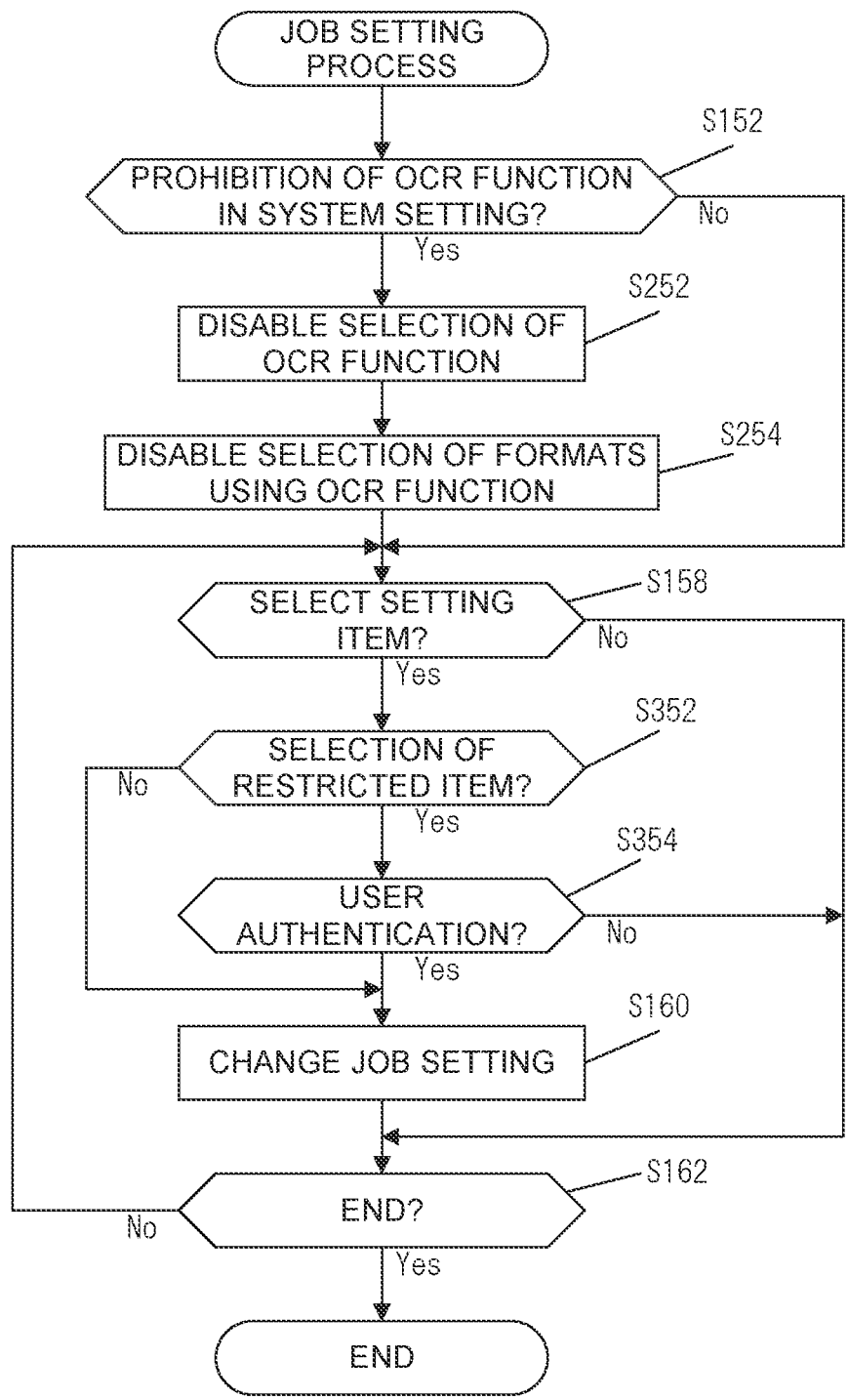

IMAGE OUTPUT APPARATUS AND IMAGE OUTPUT METHOD PERFORMING SETTING BY DISPLAYING RESPECTIVE SETTING ITEMS IN MULTIPLE SETTING SCREENS

BACKGROUND OF THE INVENTION

Field of the Invention

The present disclosure relates to an image output apparatus and the like.

Description of the Background Art

There are known techniques for restricting users from executing a certain process in image output apparatuses for security and other reasons.

For example, a technique of appropriately setting whether to convert an original paper document into reusable vector data before acquiring vector data from the paper document is known.

An object of the present disclosure is to provide a technique of appropriately performing processing even when certain function is restricted.

SUMMARY OF THE INVENTION

An image output apparatus of the present disclosure includes a controller that controls display of a first setting screen including setting items of a system to be used for a setting of operation of the image output apparatus and a second setting screen including setting items of a job to be used in a setting of operation in job execution, and an image outputter that outputs an image by executing a job based on the setting of the operation in the job execution. The controller disables a selection of the setting items of the job that uses a specific function on the second setting screen when use of the specific function is prohibited on the first setting screen.

An image output method includes displaying a first setting screen including setting items of a system to be used for a setting of operation of the image output apparatus and a second setting screen including setting items of a job to be used in a setting of operation in job execution, and outputting an image by executing a job based on the setting of the operation in the job execution. A selection of the setting items of the job that uses a specific function is disabled on the second setting screen when use of the specific function is prohibited on the first setting screen.

According to the present disclosure, even when a specific function is restricted, an appropriate process may be executed.

BRIEF DESCRIPTION OF THE DRAWINGS

FIG. 5A is a diagram illustrating an example of a data configuration of a job setting table, FIG. 5B is a diagram illustrating an example of a data configuration of a system setting, and FIG. 5C is a diagram illustrating an example of a format setting table, according to the first embodiment.

FIG. 12 is a diagram illustrating an example of the display screen (the system setting screen) according to the first embodiment.

FIG. 18 is a diagram illustrating an example of a display screen (a system setting screen) according to the second embodiment.

FIG. 20 is a flowchart of a process (a job setting process) according to a third embodiment.

DESCRIPTION OF THE PREFERRED EMBODIMENTS

Embodiments for implementing the present disclosure will be described below with reference to the accompanying drawings. Note that the embodiments below are merely examples of the present disclosure, and the content of the present disclosure is not to be construed as limited based on the following description.

General image output apparatuses and general image processing apparatuses are known to have a function (e.g., an OCR (Optical Character Recognition) function) of performing a character recognition process on an acquired document image and outputting a result of the character recognition. Here, as general specifications, a user may freely set ON or OFF of the OCR function on a setting screen (for example, a scan mode setting screen) in job execution.

On the other hand, from a viewpoint of security or the like, there is a demand for uniformly setting permission/prohibition of the OCR function in a system setting of an apparatus. However, there arises a problem in that, in a case where a setting for prohibiting use of the OCR function is made in a system setting of an apparatus, a user may not recognize, in display, items that may not be currently set unless the user controls display of items associated with the OCR function in a user interface (UI) screen.

The following embodiments are realized in terms of control of display of items associated with the function in the UI (user interface) screen according to whether the function is prohibited or permitted among functions available in the image output apparatus.

Accordingly, as an example of the image output apparatus, when prohibition of use of the OCR function is set in a system setting screen of an MFP (multifunction peripheral/printer/product), setting items associated with OCR on a system setting side (a system setting screen) are restricted or setting items associated with the OCR are restricted also on a UI (a job setting screen for a job setting at job execution, for example) of the image output apparatus.

Therefore, since the display is appropriately restricted, usability can be assured not only for administrators who use the system setting screen, but also for end users who use the job setting screen that is displayed when a job is executed.

1. First Embodiment 1.1 Entire System

Figure 1:
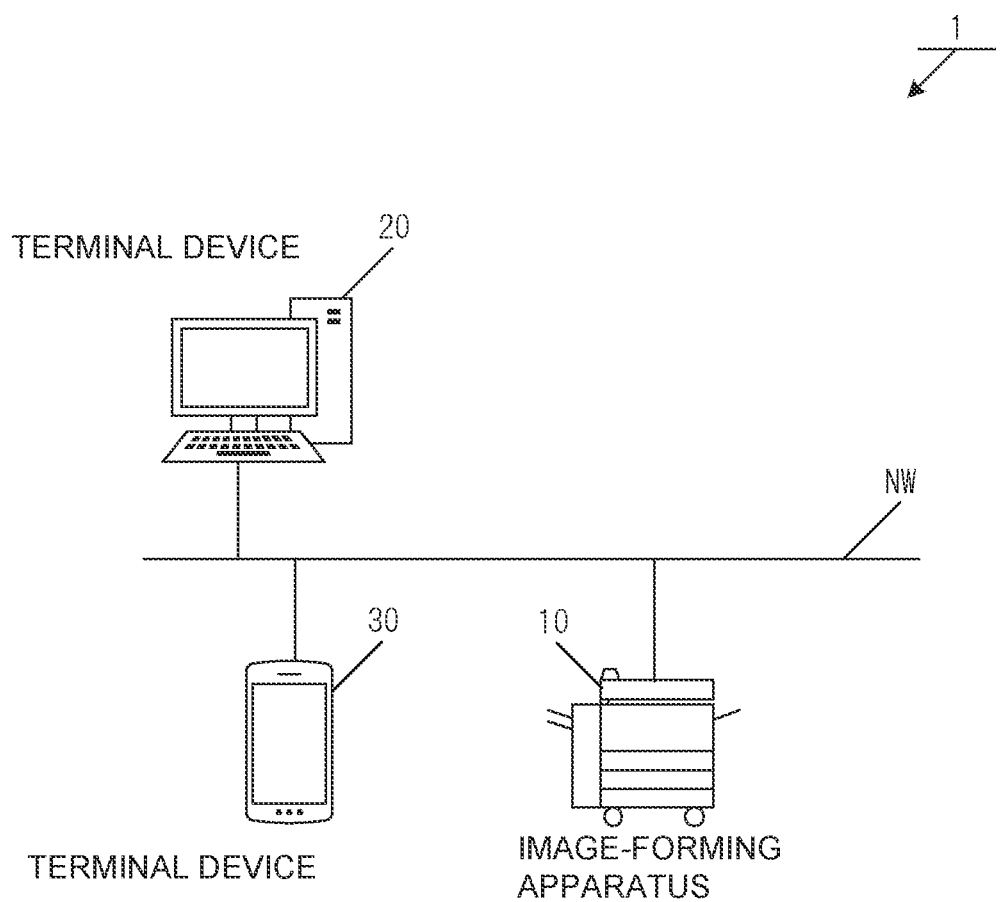
FIG. 1 is a diagram illustrating an outline of a system according to a first embodiment.

FIG. 1 is a diagram illustrating an outline of a system 1. The system 1 includes an image-forming apparatus 10, as an example of an image output apparatus, connected to a network. Here, the image-forming apparatus is generally referred to as a printer, a multifunctional peripheral (MFP), a photocopier, and a facsimile machine.

Furthermore, terminal devices 20 and 30 or the like may be connected to a network NW. The terminal device 20 is capable of submitting jobs to the image-forming apparatus 10 and displaying a system setting screen. The terminal device 20 may be, for example, connected to the network NW (e.g., a computer, a tablet, a smartphone, etc.). In FIG. 1, the terminal device 20 is a computer and the terminal device 30 is a smartphone, for example. Note that, in this specification, the description is made taking the terminal device 20 as an example.

Furthermore, the terminal device 20 (the terminal device 30) is connected to the same network NW as the image-forming apparatus 10 in the description below, but may be connected to another network. For example, the terminal device 20 may be connected to the image-forming apparatus 10 via the Internet which is an external network.

1.2 Hardware Configuration

Figure 2:
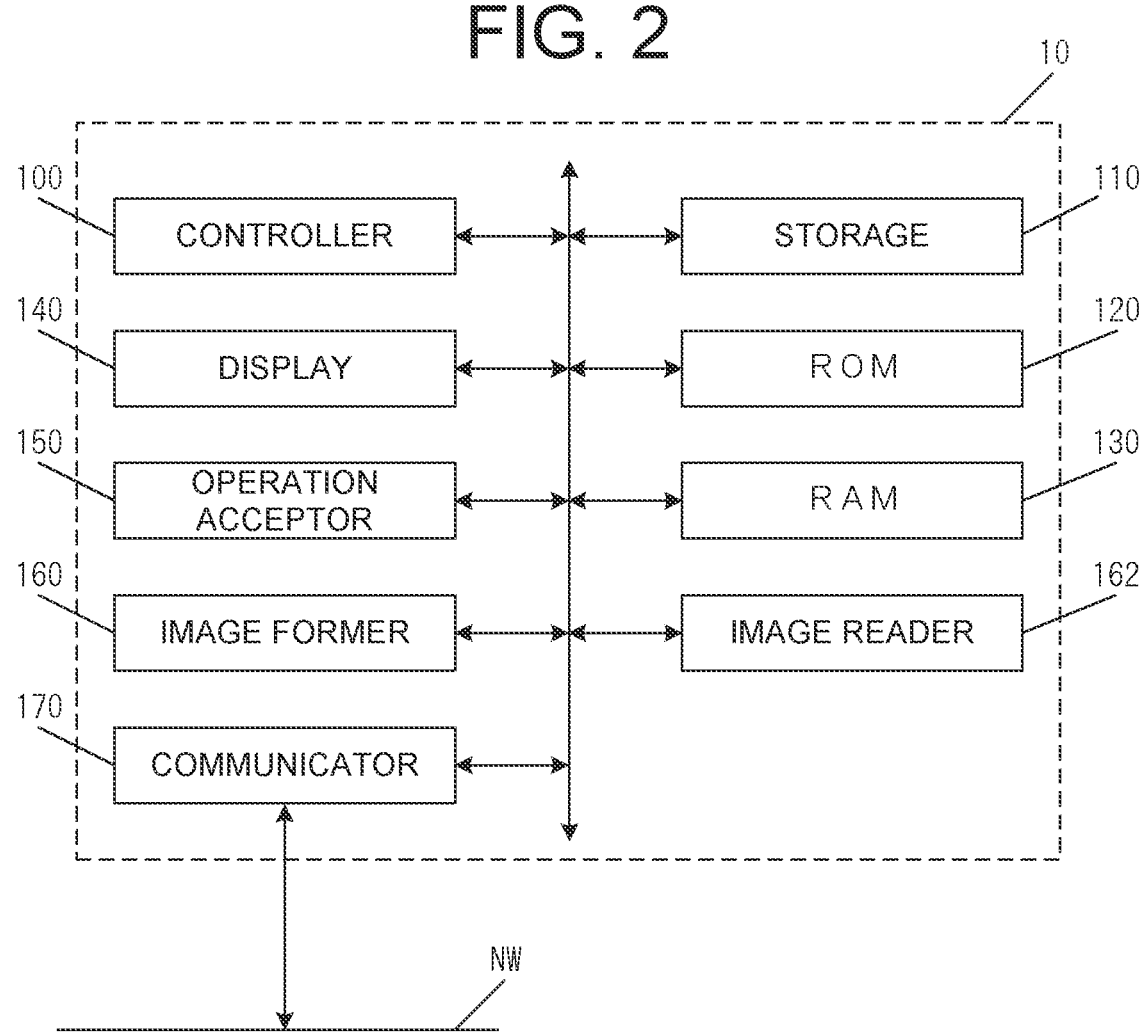
FIG. 2 is a diagram illustrating a configuration of hardware of an image-forming apparatus according to the first embodiment.
Figure 3:
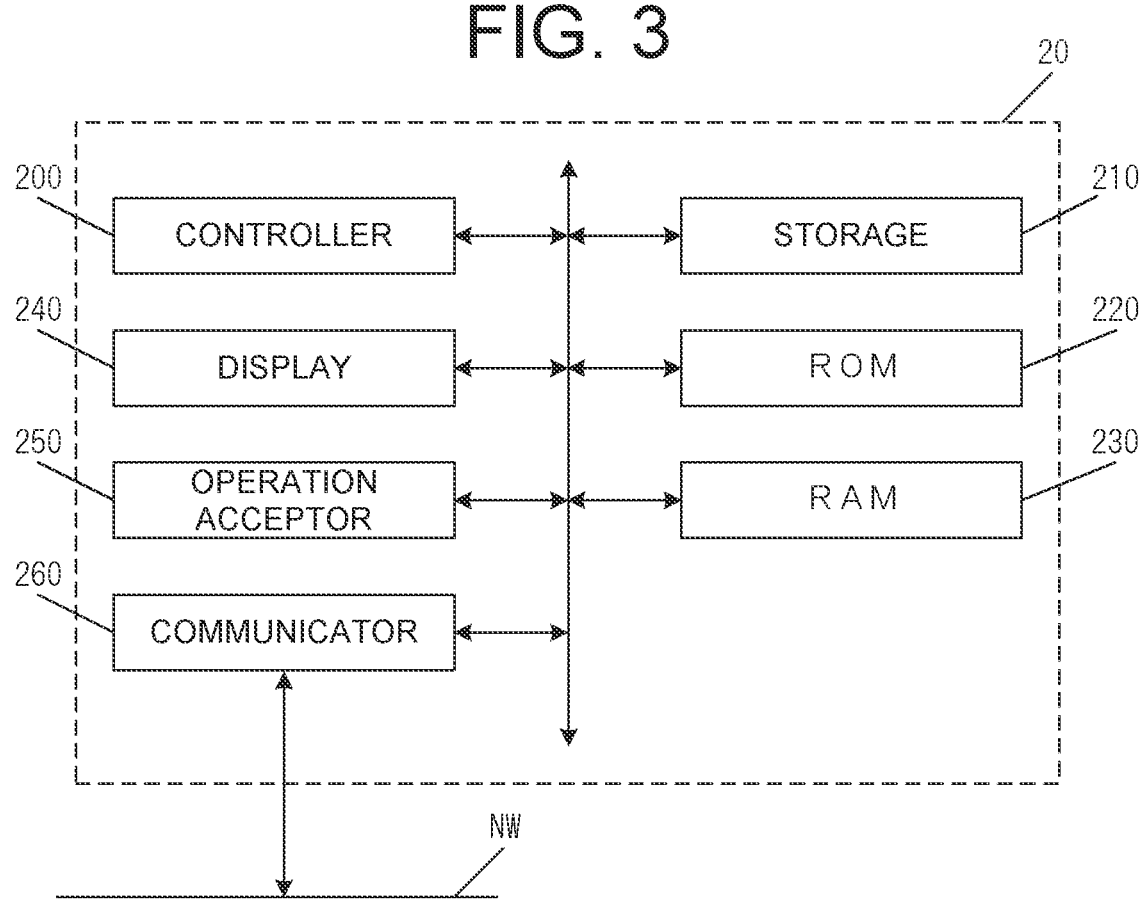
FIG. 3 is a diagram illustrating a configuration of hardware of a terminal device according to the first embodiment.

Hardware configurations of individual devices will be described hereinafter with reference to the accompanying drawings. FIGS. 2 and 3 are diagrams illustrating examples of hardware configurations of the image-forming apparatus 10 and the terminal device 20, respectively.

1.2.1 Image-Forming Apparatus

As illustrated in FIG. 2, the image-forming apparatus 10 includes a controller 100, storage devices, such as a storage 110, a ROM (Read Only Memory) 120, and a RAM (Random Access Memory) 130, a display 140, an operation acceptor 150, an image former 160, an image reader 162, and a communicator 170.

The controller 100 is a functional section that controls the entire image-forming apparatus 10. The controller 100 realizes various functions by reading and executing various programs stored in the storage 110 and the ROM 120 and may be realized by at least one control device/arithmetic device (a CPU (Central Processing Unit) or SoC (System on a Chip).

The storage 110 is a nonvolatile storage device capable of storing programs and data. The storage 110 may be constituted by, for example, a storage device, such as an HDD (Hard Disk Drive) or an SSD (Solid State Drive). Alternatively, the storage 110 may be configured as an externally connectable USB memory. Furthermore, the storage 110 may be a storage region in a cloud, for example.

The ROM 120 is a nonvolatile memory capable of retaining programs and data even when the power is turned off.

The RAM 130 is a main memory mainly used when the controller 100 executes processing. The RAM 130 is a rewritable memory that temporarily holds programs read from the storage 110 and the ROM 120, as well as data including results of the execution.

The display 140 is a display device capable of displaying various information and an execution screen. The display 140 may be a display device, such as a liquid crystal display (LCD), an organic electro-luminescence (EL) display, or an electrophoretic display, for example. Furthermore, the display 140 includes an interface to which a display device can be connected. For example, the display 140 may be configured by an external display device connected through an HDMI (registered trademark) (high-definition multimedia interface), or a DVI (digital visual interface), or Display Port.

The operation acceptor 150 is an operation device that accepts operation inputs performed by a user. For example, the operation acceptor 150 may be a touch panel integrated with the display 140 or an operation device, such as an operation button. Furthermore, the operation acceptor 150 may include an interface to which an operation device can be connected. For example, the image-forming apparatus 10 may be connected to a different operation device (an operation device with a touch panel).

The communicator 170 is a communication interface for communicating with other devices. For example, the communicator 170 may be a network interface capable of providing wired or wireless connection. In this embodiment, communication is available with other devices via the network NW.

The image former 160 forms images, for example, on a recording sheet. For example, the image former 160 includes an image carrier and forms an image by forming a toner image on the image carrier and transferring the image on the image carrier onto a recording sheet. The image former 160 may be configured as an image-forming apparatus, such as a printer. Furthermore, the image former 160 may electronically form an image as an image file.

The image reader 162 reads a document (an image) to be output as image data. The image reader 162 is a scanner, for example, and may be a reading device using a CCD (Charge Coupled Device) or a CIS (Contact Image Sensor).

1.2.2 Terminal Device

As illustrated in FIG. 3, the terminal device 20 includes a controller 200, storage devices including a storage 210, a ROM 220, and a RAM 230, a display 240, an operation acceptor 250, and a communicator 260.

These components are similar in a basic configuration to those in the image-forming apparatus 10 described above. For example, the controller 200 is a functional portion that controls the entire terminal device 20. The controller 200 realizes various functions by reading and executing various programs stored in the storage 210 and the ROM 220 and is realized by at least one control device/arithmetic device (a CPU (Central Processing Unit) or SoC (System on a Chip).

The storage 210 is a nonvolatile storage device capable of storing programs and data. The storage 210 may be constituted by, for example, a storage device, such as an HDD (Hard Disk Drive) or an SSD (Solid State Drive). Alternatively, the storage 210 may be configured as an externally connectable USB memory, a CD-ROM drive, or a BD-drive. Furthermore, the storage 210 may be a storage region in a cloud, for example.

1.3 Software Configuration

Figure 4:
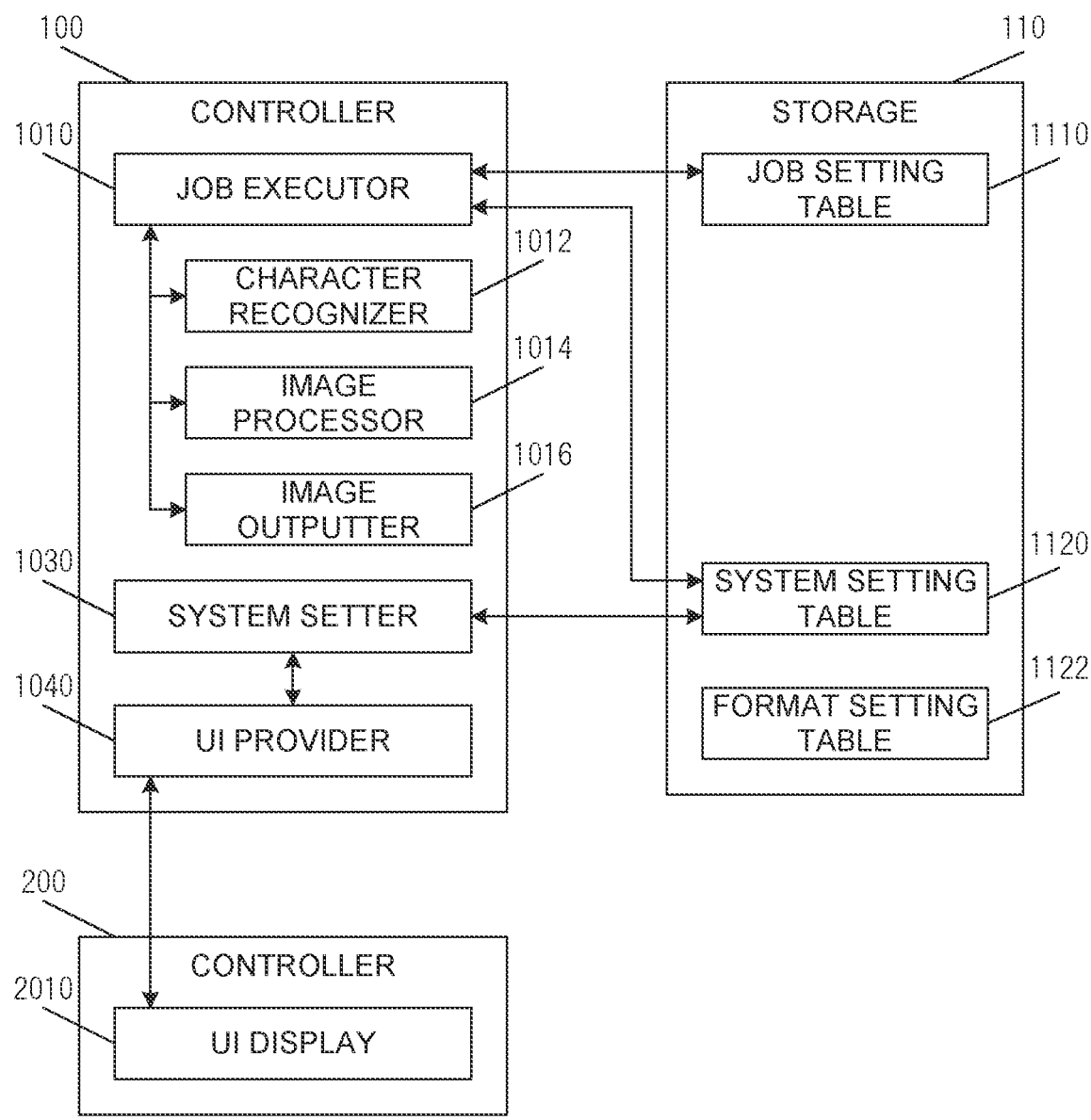
FIG. 4 is a diagram illustrating a configuration of software of according to the first embodiment.

A software configuration will be described with reference to FIG. 4. FIG. 4 is a diagram illustrating software configurations of the image-forming apparatus 10 and the terminal device 20.

The controller 100 of the image-forming apparatus 10 executes programs (applications) stored in the storage 110 or the ROM 120 to function as a job executor 1010, a character recognizer 1012, an image processor 1014, an image outputter 1016, a system setter 1030, and a user interface provider (a UI provider) 1040.

Furthermore, the storage 110 of the image-forming apparatus 10 stores a job setting table 1110, a system setting table 1120, and a format setting table 1122.

The job executor 1010 executes a job selected by the user. Examples of the job may include a copy job for realizing a copy function, a print job for performing printing based on print data transmitted from the terminal device 20, a scan job for reading a document and outputting the document as image data in a case where the image reader 162 is a scanner device, and a fax job for transmitting and receiving image data through facsimile communication. The job executor 1010 executes a character recognition process, an image process, and a file output process depending on a job to be executed.

Furthermore, the job executor 1010 also displays a screen for the user to execute a job. For example, the job executor 1010 displays a job mode screen for the user to submit a job, a job setting screen for the user to perform settings for job execution, and a job execution screen to be displayed when the user executes a job.

The character recognizer 1012 performs character recognition. When the character recognition process is performed on an image read by the image reader 162, for example, character data can be output. The character recognizer 1012 may perform the character recognition by recognizing patterns of characters, for example. The character recognition process realized by the character recognizer 1012 is referred to as an OCR (Optical Character Recognition) process, for example, and includes a layout analysis process, a line/character extraction process, and a character pattern matching process.

The image processor 1014 executes various processes on an image. The image processor 1014 can realize various functions in addition to general image processes including a tone conversion process of converting image tones and a sharpening process of sharpening images, for example.

The image processor 1014 may further perform a specific process using a result of the process performed by the character recognizer 1012 and the character data output by the character recognizer 1012. For example, the image processor 1014 may perform a process of determining an orientation of an image by using an orientation of characters determined by the character recognizer 1012 during the character recognition (a top and bottom determination process). For example, the image processor 1014 may execute an automatic file name setting process of setting a file name based on character data output by the character recognizer 1012.

Furthermore, the image processor 1014 may realize a process of extracting a specific pattern from an input image and outputting a plurality of images. For example, the image processor 1014 may realize a process of detecting an image of a business card on an input image and outputting the image as business card data (a business card scan process). The image processor 1014 may recognize a company name, a name, a title, an address, a telephone number, and the like described on the business card using character data output by the character recognizer 1012.

The image outputter 1016 outputs a predetermined image. For example, the character recognizer 1012 performs a character recognition process on an image (an input image) read by the image reader 162. The image outputter 1016 can output the image (the input image) read by the image reader 162 together with character data recognized by the character recognizer 1012 as an image (an output image).

The image outputter 1016 can also output an image as a file. For example, the image outputter 1016 can output image data as a file of image data (an image file) or a document file. Furthermore, the image outputter 1016 may temporarily output data on an image and output the image to other devices. For example, the image outputter 1016 can print an image on a recording sheet after outputting the image to the image former 160. Moreover, the image outputter 1016 may output an image to other devices via facsimile communication through the image former 160 or the communicator 170.

In addition, the image outputter 1016 can output an image processed by the image processor 1014 as a file in a predetermined format. The image outputter 1016 can output files in various file formats, such as PDF (Portable Document Format) files, text files (e.g., DOC format files, DOCX format files, and ODT format files), spreadsheet files (e.g., XLS format files, XLSX format files, and ODS format files), and image files (e.g., TIFF format files and JPEG format files).

The system setter 1030 performs a system setting which is an overall system setting of the image-forming apparatus 10. Here, the system setting is commonly used when the image-forming apparatus 10 operates, and is also used when a job is executed. The system setter 1030 is typically set or updated by a specific user (e.g., an administrator). The system setter 1030 stores the system setting as a system setting table 1120 in the storage 110 that is a storage region.

Furthermore, the system setter 1030 can change the system setting using the external terminal device 20 via the UI provider 1040. The UI provider 1040 provides a web interface to the connected terminal device 20 to enable a change of the system setting, for example.

For example, when the controller 200 of the terminal device 20 executes a UI display 2010, a UI provided in the UI provider 1040 is displayed. For example, the UI display 2010 is realized as a web browser in the terminal device 20. Furthermore, the UI display 2010 may be a dedicated application executed on the terminal device 20.

The UI display 2010 can access the system setter 1030 via the UI provider 1040. The user can then change the system setting of the image-forming apparatus 10 via the terminal device 20 by changing the system setting displayed on the UI display 2010.

Note that, although a system setting screen is displayed in the image-forming apparatus 10 in the following embodiments, for example, the system setting screen may be displayed in an external device, such as the terminal device 20, in this manner.

The job setting table 1110 stores a job setting. The job setting includes setting values that are referenced by the job executor 1010 when the job executor 1010 executes a job. The user can change the setting values before executing a job. FIG. 5A is a diagram illustrating an example of the job setting table 1110.

For example, the job setting table 1110 stores a job mode (e.g., "e-mail scan"), a format of an output file when a job is executed (e.g., "PDF"), an item indicating whether to perform character recognition (whether to use the OCR function) (e.g., "ON"), resolution for scan of an image (or resolution of an output file) (e.g., "400 dpi"), a compression rate of an output file (e.g., "Medium"), an item indicating whether an output file is to be encrypted (e.g., "OFF"), and a method for outputting a file (e.g., "OFF" for outputting a file page by page).

The job executor 1010 executes a job by referring to the job setting stored in the job setting table 1110 in job execution.

The system setting table 1120 stores a common system setting in the image-forming apparatus 10. FIG. 5B is a diagram illustrating an example of the system setting table 1120.

For example, the system setting table 1120 stores a setting value (e.g., "OFF") for "Prohibition of transmission from PC-Fax" as a setting item. Furthermore, the system setting table 1120 may store a common setting among users. For example, the system setting table 1120 stores a setting indicating whether a user can use the OCR function at job execution (e.g., "Prohibition of OCR" and "OFF").

Here, the setting for whether a user can use the OCR function in the image-forming apparatus 10 is stored in the system setting (the system setting table 1120) and the job setting (the job setting table 1110). For the use of the OCR function, as a rule, the values set in the system setting take precedence over the job setting. Therefore, it is preferable that the OCR function may not be enabled in the job setting when the OCR function is not available in the system setting (prohibition of OCR is "ON").

The format setting table 1122 sets functions required in formats of files output by the image outputter 1016. For example, an example of a data configuration of the format setting table 1122 is illustrated in FIG. 5C. For example, the format setting table 1122 stores whether the use of the OCR function is required for each format (e.g., "DOCX"). Here, "required" indicates that the OCR function is required in a case where the image outputter 1016 outputs a file in a format corresponding to "required". Furthermore, "not required" indicates that the OCR function is not required even in a case where the image outputter 1016 outputs a file in a format corresponding to "not required". The format setting table 1122 may be stored as internal information by the image outputter 1016 or the like.

1.4 Screen Transition Screen transitions according to this embodiment will be described with reference to FIG. 6. The image-forming apparatus 10 can perform switching among a home screen (D10), a system setting screen (D12), a job mode screen (D14), a job setting screen (D16), and a job execution screen (D18), for example.

First, the image-forming apparatus 10 displays the home screen (D10). The home screen (D10) is displayed in a menu mode (a home mode), for example. Users can switch to each mode from the home screen by selecting a setting item displayed on the home screen or by submitting a job.

Here, when the user selects the system setting on the home screen (D10), the image-forming apparatus 10 is changed from the menu mode to a system setting mode. In the system setting mode, the system setter 1030 displays the system setting screen (D12). The system setting screen (D12) allows the user to change the system setting which is the common setting for operation of the image-forming apparatus 10 and is used to set functions of the image-forming apparatus 10. The system setting screen may be displayed in the image-forming apparatus 10 or in the external terminal device 20 accessing the image-forming apparatus 10. The system setting mode is executed by the administrator, for example. Therefore, the system setting screen (D12) is displayed, for example, by the administrator.

After the setting values of the system setting are changed or registered by the administrator in the system setting screen (D12), the image-forming apparatus 10 enters the home mode and the home screen (D10) is displayed.

When the user selects the job mode on the home screen (D10), the image-forming apparatus 10 executes the selected job mode. When the job mode is executed, the controller 100 (the job executor 1010) displays the job mode screen (D14) corresponding to a job that has been executed. Examples of the job mode screen for executing the job mode include a copy screen for executing a copy job, a scan screen for executing a scan job, and a fax screen for executing a fax communication job.

Here, the user selects the job setting to change a setting of the job mode. When the user selects the job setting, the image-forming apparatus 10 displays the job setting screen (D16). The user can change a setting of a job to be executed on the job setting screen. Furthermore, the user can select a function to be used in the job. For example, the user can select use of the OCR function.

After the user performs the job setting on the job setting screen, the image-forming apparatus 10 changes the screen to the job mode screen (D14). In a case where the user instructs execution of a job, the image-forming apparatus 10 displays the job execution screen (D18) and executes the job. When the image-forming apparatus 10 completes the execution of the job, the screen is changed to the job mode screen (D14) again. When the job mode is terminated, the image-forming apparatus 10 enters the home mode and displays the home screen (D10).

Note that the setting items for the job setting may be displayed on the job mode screen (D14) as well as on the job setting screen (D16). For example, frequently-used setting items (e.g., a selection of a file output format, resolution at reading of a document, etc.) may be displayed on the job mode screen. Furthermore, frequently-used setting values may be displayed on the job mode screen, and less-frequently used setting values may be displayed on the job settings screen.

Accordingly, the image-forming apparatus 10 according to this embodiment has the two setting screens. Specifically, the image-forming apparatus 10 has, as a first setting screen, the system setting screen mainly used by the system administrator and, as a second setting screen, the job setting screen mainly used by the user.

Figure 6:
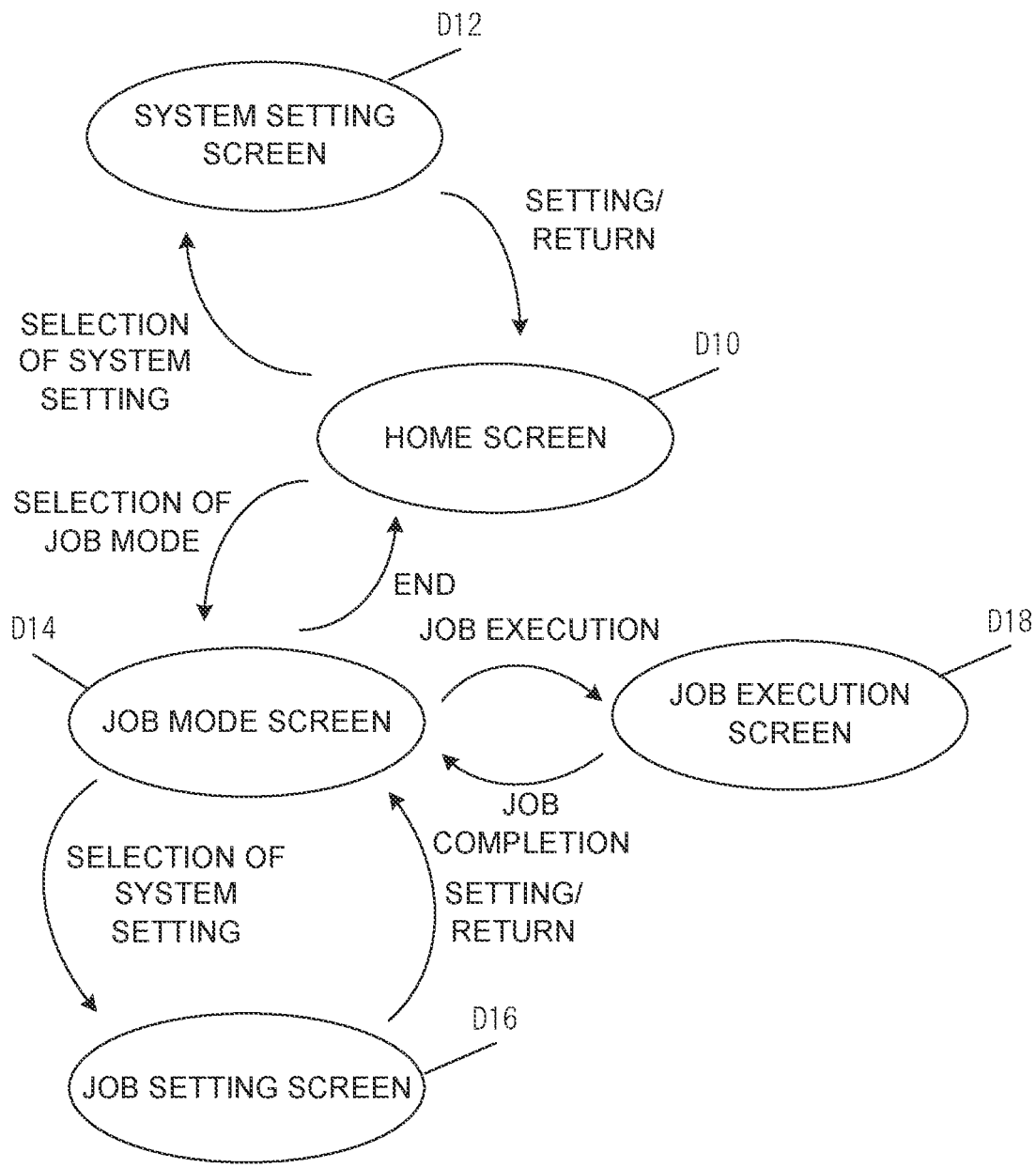
FIG. 6 is a diagram schematically illustrating screen changes according to the first embodiment.

Note that the individual screens illustrated in FIG. 6 may be displayed in the image-forming apparatus 10 or other devices. For example, the terminal device 20 or the terminal device 30 may display the individual screens via a web browser. Furthermore, the terminal device 20 or the terminal device 30 may execute applications, such as an operation application and a setting application, and display the individual screens in the applications.

1.5 Processing Flow 1.5.1 Main Process

Figure 7:
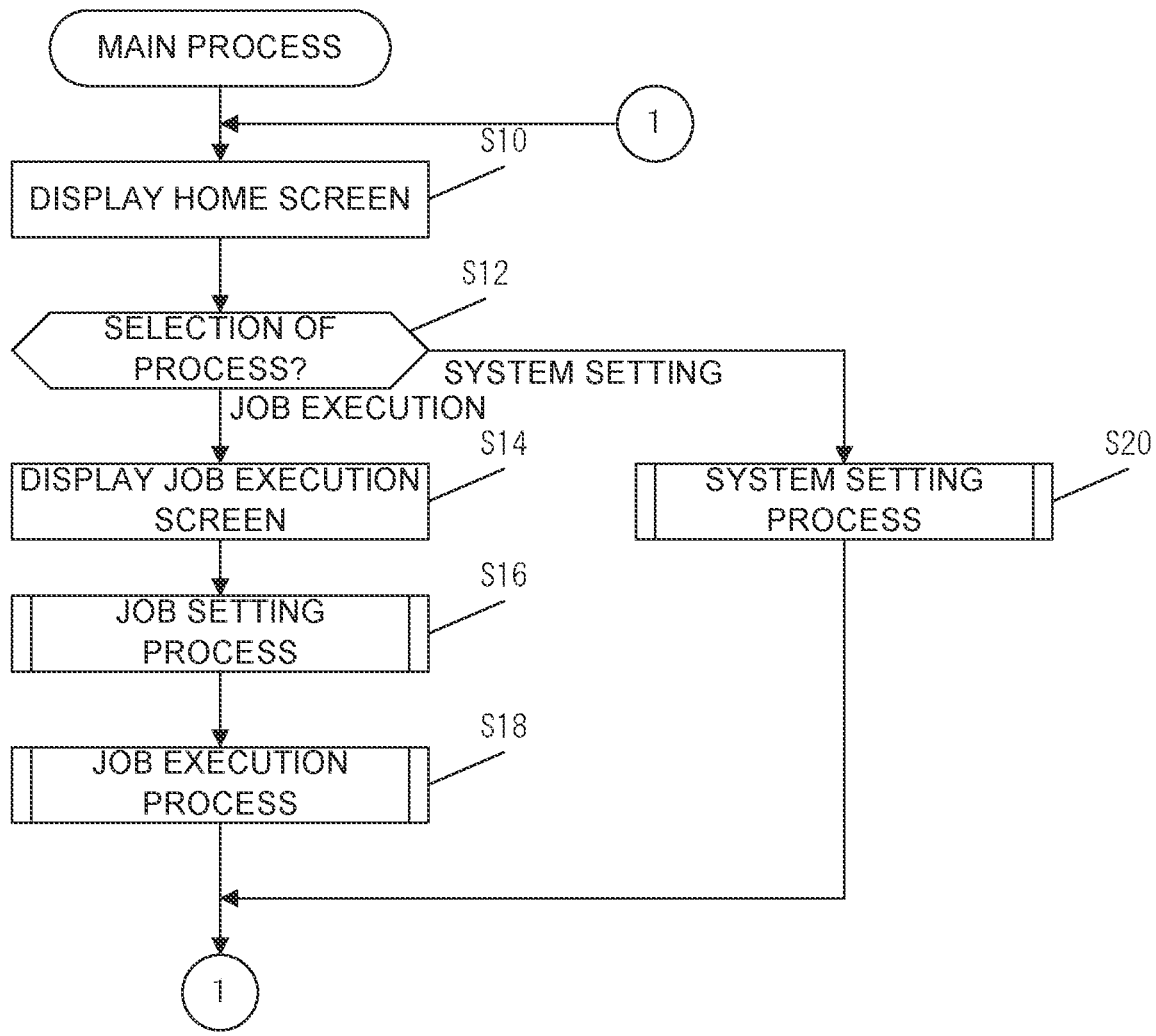
FIG. 7 is a flowchart of a process (a main process) according to the first embodiment.

Referring to FIG. 7, the following describes a flow of a main process according to this embodiment. The controller 100 displays the home screen (step S10) in the image-forming apparatus 10. The controller 100 then allows the user to select a process (step S12). Here, when the user selects job execution (step S12; job execution), the job executor 1010 starts the job execution.

The job executor 1010 displays the job execution screen (step S14). Then the job executor 1010 executes a job setting process where appropriate (step S16). After the user performs the job setting, the job executor 1010 executes a job based on the job setting (step S18). Note that, when the controller 100 may not execute the job setting process when the user does not perform an operation of the job setting.

Furthermore, when the system setting is selected on the home screen (step S12; system setting), the controller 100 switches the operation mode to the system setting mode. In other words, the controller 100 (the system setter 1030) executes the system setting process (step S20).

1.5.2 System Setting Process

Figure 8:
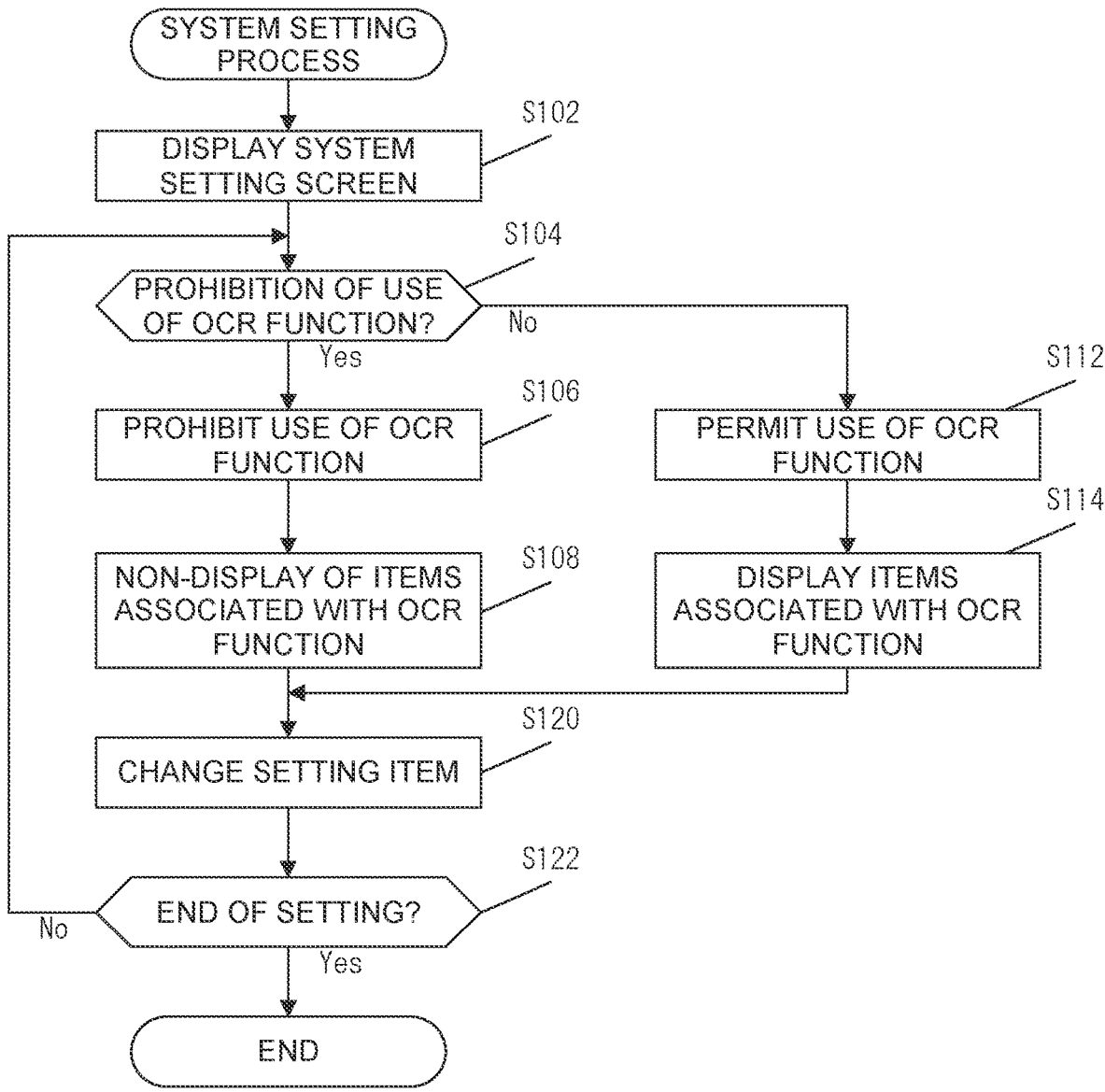
FIG. 8 is a flowchart of a process (a system setting process) according to the first embodiment.

FIG. 8 is a flowchart of the system setting process executed by the controller 100. The system setting process is performed in step S20 in FIG. 7 and is executed by the system setter 1030 in the system setting mode.

First, the controller 100 (the system setter 1030) displays the system setting screen (step S102). Here, the system setting screen may be displayed on the display 140 of the image-forming apparatus 10. Alternatively, the system setting screen may be displayed on the display 240 of the terminal device 20 via the UI provider 1040. In the terminal device 20, the UI display 2010 displays the system setting screen on the display 240.

The controller 100 (the system setter 1030) determines whether the use of a particular function is prohibited on the system setting screen. In this embodiment, as the specific function, the OCR function that performs the character recognition process and outputs a file is described.

When use of the OCR function is not prohibited (step S104; No), the controller 100 permits the use of OCR function (step S112). Here, when the administrator of the system setting screen sets permission of the use of the OCR function, the controller 100 sets permission of the use of the OCR function. When the use of the OCR function has already been permitted in the setting, the controller 100 maintains the setting as it is.

When the use of the OCR function is permitted, the controller 100 displays items associated with the OCR function as setting items on the system setting screen (step S114). This allows the administrator using the system setting screen to properly set the setting items associated with the OCR function.

When the use of the OCR function is prohibited, the controller 100 prohibits the use of the OCR function (step S104; Yes→step S106). Here, when the administrator using the system setting screen sets prohibition of the use of the OCR function, the controller 100 sets prohibition of the use of the OCR function. When the use of the OCR function has already been prohibited in the setting, the controller 100 maintains the setting as it is.

When the use of the OCR function is prohibited, the controller 100 does not display the setting items associated with the OCR function on the system setting screen (step S108). This allows the administrator using the system setting screen to perform the setting of the system without inconsistency, since the setting items associated with the OCR function are not unnecessarily displayed.

The controller 100 then reflects changes made to the setting items by the administrator using the system setting screen (step S120).

When all settings are completed, the controller 100 terminates this process (step S122; Yes). Furthermore, when the administrator is required to set further items, the controller 100 repeatedly performs the process from step S104 (step S122; No→step S104).

1.5.2 Job Setting Process

Figure 9:
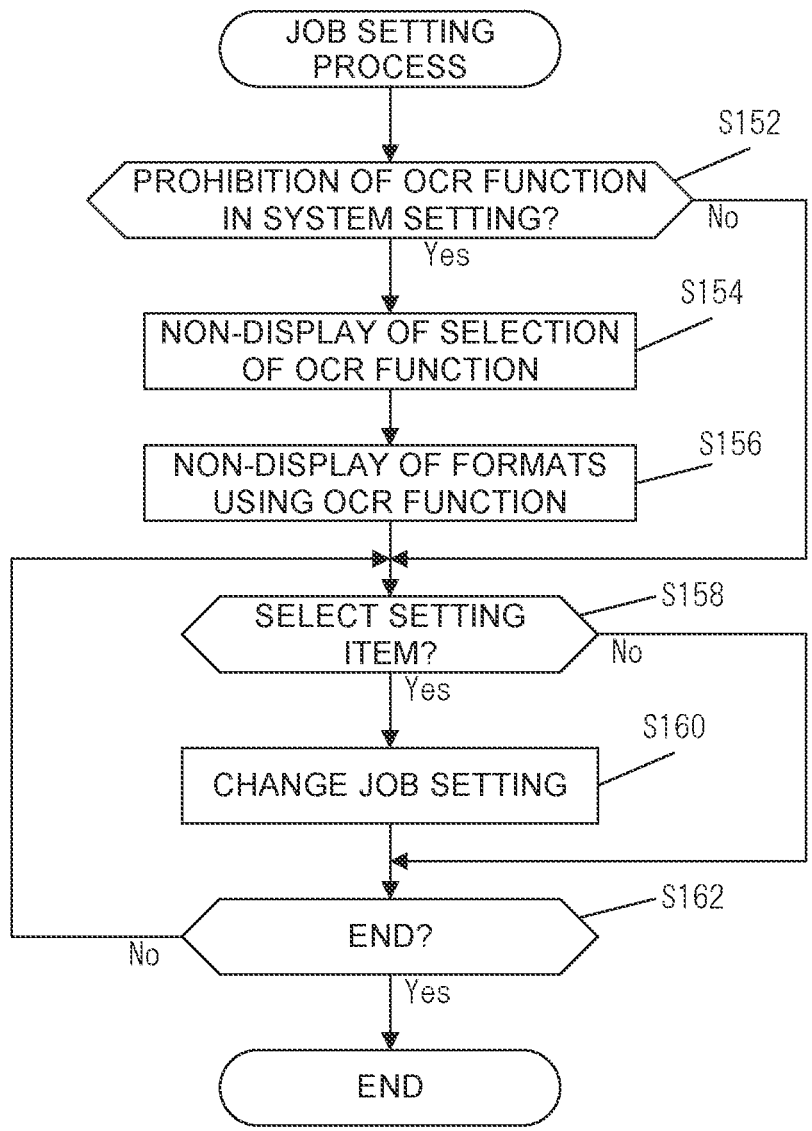
FIG. 9 is a flowchart of a process (a job setting process) according to the first embodiment.

FIG. 9 is a flowchart of the job setting process executed by the controller 100. The job setting process is performed in step S16 in FIG. 7 and is executed by the job executor 1010 in the job mode.

When the use of the OCR function is prohibited in the system setting (e.g., "Prohibition of OCR" is "ON"), the controller 100 does not display a setting item for selecting the OCR function (step S152; Yes→step S154).

Furthermore, the controller 100 does not display file formats that use the OCR function in the file format setting item (step S156).

Subsequently, when the user selects a displayed setting item, the controller 100 changes the job setting in accordance with the selected setting item (step S158; Yes→step S160). When an operation of terminating the job setting process is performed, the controller 100 terminates this process (step S162; Yes). Furthermore, when the user further sets an item, the controller 100 repeatedly performs the process from step S158 (step S162; No).

Thus, the setting items that use the OCR function are not displayed on the job setting screen of this embodiment. Accordingly, the contradiction in which the user selects a format that requires the use of the OCR function even though the OCR function is prohibited in the system can be avoided.

In addition, when the setting of the OCR function is displayed even though the use of the OCR function is prohibited for security reasons, users may feel compelled to use the OCR function or complain that the function they can originally use is restricted.

However, since the setting items that use the OCR function are not displayed on the job setting screen in the first place, the user may not know the use of the OCR function, and accordingly, the complaints described above may be effectively suppressed.

1.6 Operation Example

Figure 10:
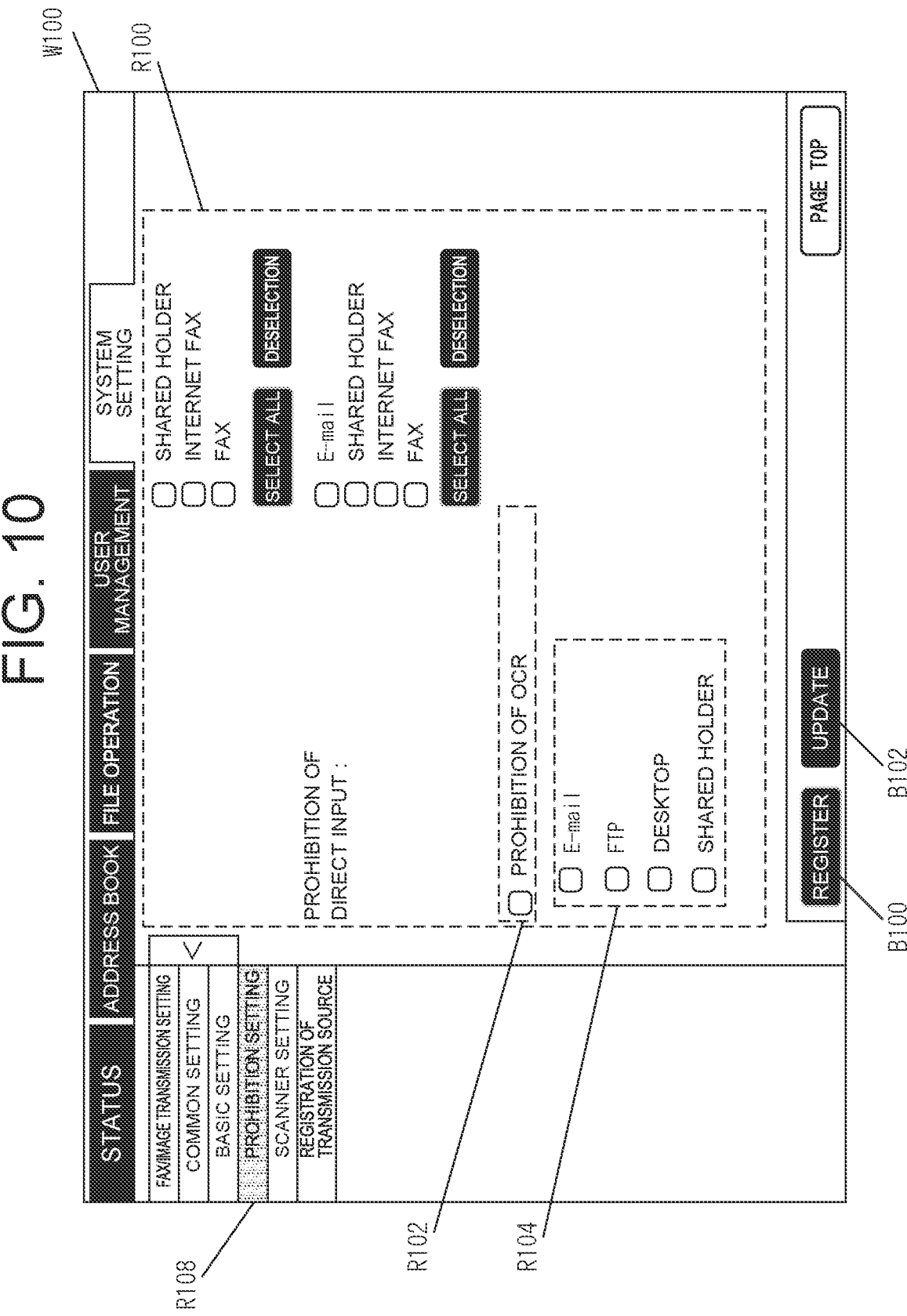
FIG. 10 is a diagram illustrating an example of a display screen (a system setting screen) according to the first embodiment.

An operation example will be described using an example of a display screen. FIG. 10 is a diagram illustrating a display screen W100 which is an example of the system setting screen. The display screen W100 may be displayed on the display 140 of the image-forming apparatus 10 or on the display 240 of the terminal device 20.

Here, the display screen W100 is displayed in the system setting mode of the image-forming apparatus 10, for example. Furthermore, the display screen W100 displays, as examples, setting fields associated with the fax/image transmission setting in the system setting. For example, in a region R108, "Prohibition Setting" is selected by a tab for switching setting columns, and setting items to be prohibited are displayed in a region R100.

Here, the region R100 displays a plurality of setting items to be prohibited in the system. Among the setting items of the system setting, "Prohibition of OCR" is displayed in a region R102 as a setting item to prohibit the use of the OCR function in this embodiment. The use of the OCR function is restricted when the administrator displaying the system screen (the administrator is a user who has administrative authority or the authority to perform the system setting) checks a checkbox "Prohibition of OCR".

Furthermore, the restriction on the OCR function may be set for each operation mode (a job type and a job mode) of the image-forming apparatus 10. The operation modes are divided, for example, by types of jobs that can be executed by the image-forming apparatus 10 of a destination (output destination) of a file.

For example, in a region R104, "Prohibition" can be set for individual operation modes (e.g., an E-mail mode, an FTP mode, a desktop mode, and a shared folder mode). For example, when the administrator checks the field of "E-mail", the use of the OCR function is prohibited in an E-mail job mode. Specifically, the user may not output files that use the OCR function in an E-mail job.

Here, when at least one job mode is checked in the region R104, an arbitrary job mode or arbitrary job modes may be set to be prohibited. Furthermore, in a case where the use of the OCR function is prohibited in the region R102, the use of the OCR function is prohibited for all job modes. Therefore, it is preferable that the settings of the regions R102 and R104 are exclusively made.

The items set in the region R100 are newly stored in the system setting table 1120 when a registration button B100 is selected. Furthermore, content of the items set in the region R100 is newly stored in the system setting table 1120 when an update button B102 is selected.

Figure 11:
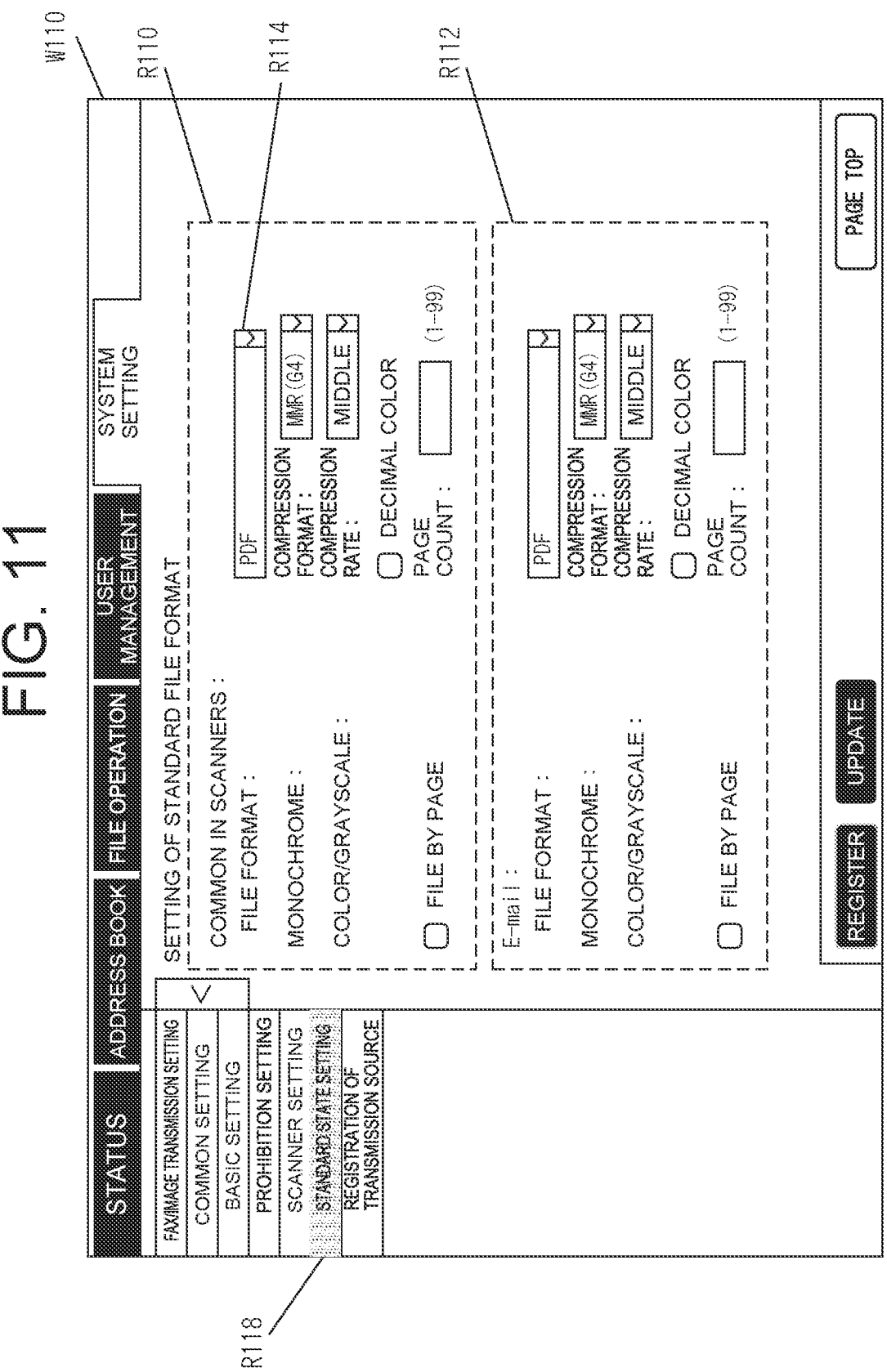
FIG. 11 is a diagram illustrating an example of the display screen (the system setting screen) according to the first embodiment.

FIG. 11 is a diagram illustrating an example of a display screen W110 which is the system setting screen. The display screen W110 is an example of a screen for setting an operation mode of the scanner. For example, the system setting screen is displayed when a standard state setting is selected in a region R118 after selecting a fax/image setting and a scanner setting, for example.

On the display screen W110, a setting common to scanners is displayed but the setting items associated with the OCR function are not displayed. For example, FIG. 12 is a diagram illustrating an example of a display screen W120 for performing a setting common to scanner in a case where the use of the OCR function is permitted.

On the display screen W120, setting items for performing a setting common to scanners are displayed in a region R120. In the region R120, a setting item for selecting whether to use the OCR function is displayed in a region R124.

On the display screen W110 of FIG. 11, the setting items for performing a setting common to scanners are displayed in a region R110. In the region R110, the setting item for selecting whether to use the OCR function is not displayed. Specifically, since the use of the OCR function is prohibited in the system setting, the setting items associated with the OCR function are not displayed also on the other setting screens.

Furthermore, in the display screen W120 in FIG. 12, in the scanner common setting, a font setting in a case where the OCR function is used is displayed in a region R122. In the font setting, fonts in western languages, Japanese, and other foreign languages may be set. Then, a unique setting item for the E-mail job mode is displayed in a region R126 below the region R122 where the fonts are set.

On the other hand, in the display screen W110 in FIG. 11, the setting items associated with the font setting are not displayed. This is because the setting items for the font setting are associated with the OCR function. Therefore, on the display screen W110, the setting items common to scanners are displayed in the region R110, and the unique setting item in the E-mail job mode is displayed in the region R112 below the region R110.

Figure 13A:
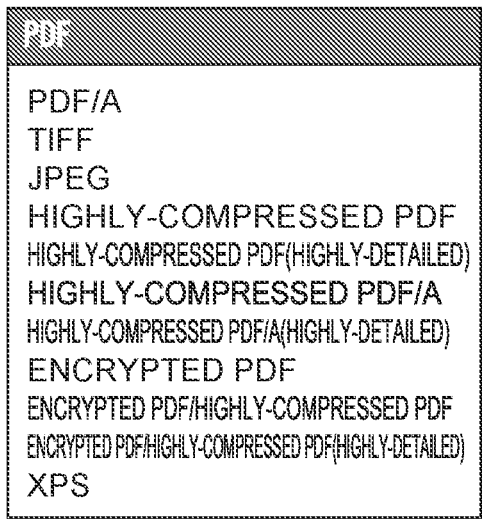
FIG. 13A is a diagram illustrating examples of restricted formats and FIG. 13B is a diagram illustrating examples of unrestricted formats according to the first embodiment.

Furthermore, in the display screen W110, for example, an output format for file output can be selected in a region R114. Here, an example in which a file type is selected in the region R114 is shown, for example, in FIG. 13A. In FIG. 13A, a state in which "PDF" is currently selected and other output formats are selectively displayed is illustrated. Any of the output formats illustrated in FIG. 13A does not use the OCR function. For example, when the region R128 in FIG. 12 is selected, the output formats displayed in FIG. 13B may be selected.

Figure 13B:
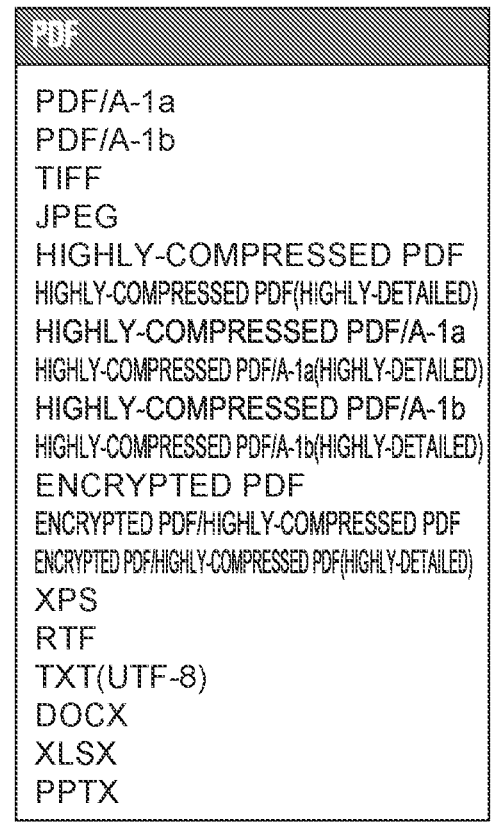

Comparing FIG. 13A with FIG. 13B, for example, a "DOCX" format, which is shown as selectable in FIG. 13B, is not shown in FIG. 13A. This is because the OCR function is essential in a case where the image outputter 1016 outputs files in the DOCX format. Thus, the file output formats that use the OCR function are not displayed in this embodiment.

Figure 14A:
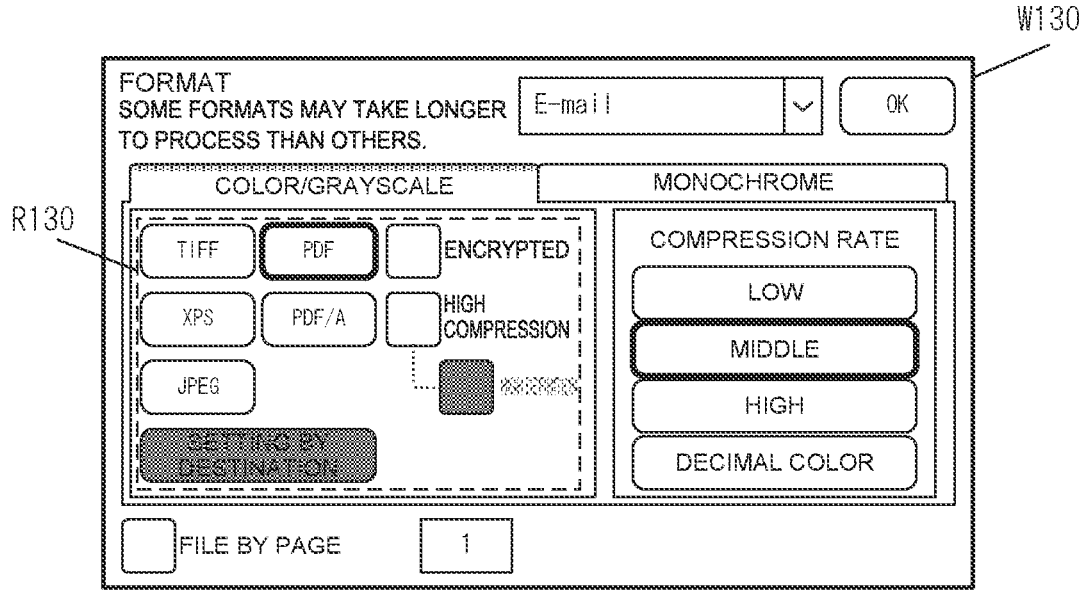
FIGS. 14A and 14B are diagrams illustrating examples of a display screen (a job setting screen) according to the first embodiment.
Figure 14B:
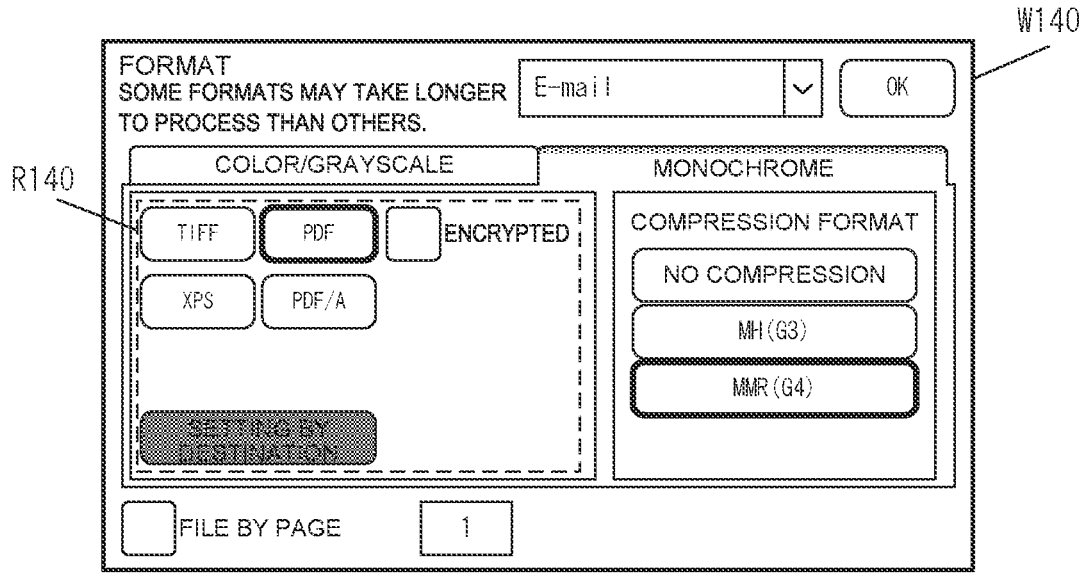

This is also true for the job setting screen that can be displayed at job execution. For example, FIGS. 14A and 14B are examples of the job setting screen. FIG. 14A is a diagram illustrating a display screen W130 that is an example of the job setting screen in a color/grayscale mode, and FIG. 14B is a diagram illustrating a display screen W140 that is an example of a job setting screen in a monochrome mode.

For example, in a region R130 on the display screen W130, an output format of a file to be output may be selected. In the region R130, formats that do not use the OCR function are displayed.

Figure 15A:
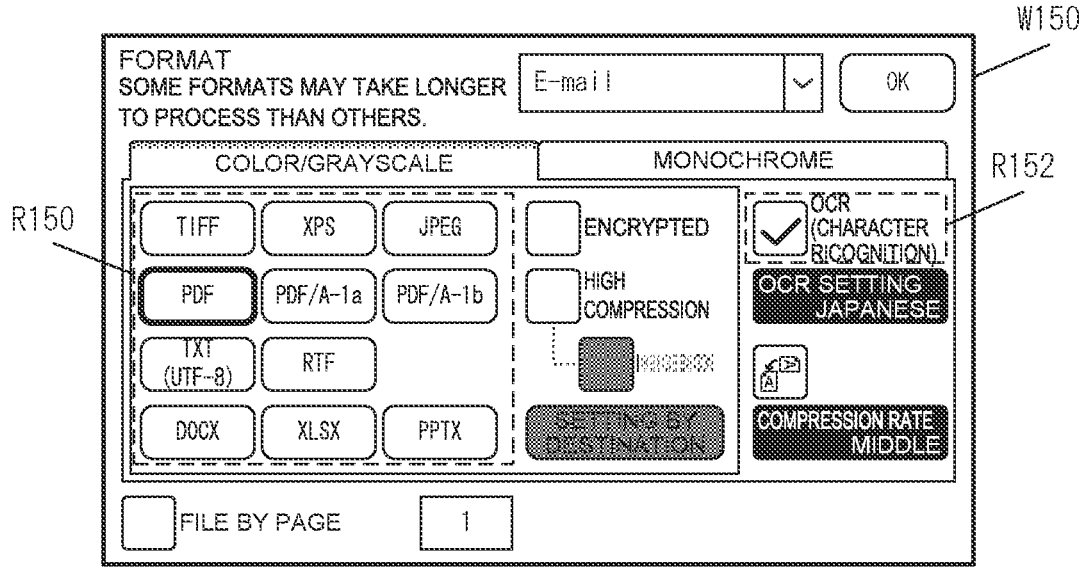
FIGS. 15A and 15B are diagrams illustrating examples of the display screen (the job setting screen) according to the first embodiment.

Examples of the job setting screen displayed in a case where the OCR function is permitted are illustrated in FIG. 15. FIG. 15A a diagram illustrating a display screen W150 that is an example of the job setting screen in the color/grayscale mode. Here, in the region R150, output formats that use the OCR function are also displayed.

Furthermore, on the display screen W150, a check box (or a selection button) capable of switching the OCR function ON/OFF is displayed in a region R152. An equivalent of the region R152 in display screen W150 is not shown in display screen W130 in FIG. 14A because it is a setting item that uses the OCR function.

Figure 15B:
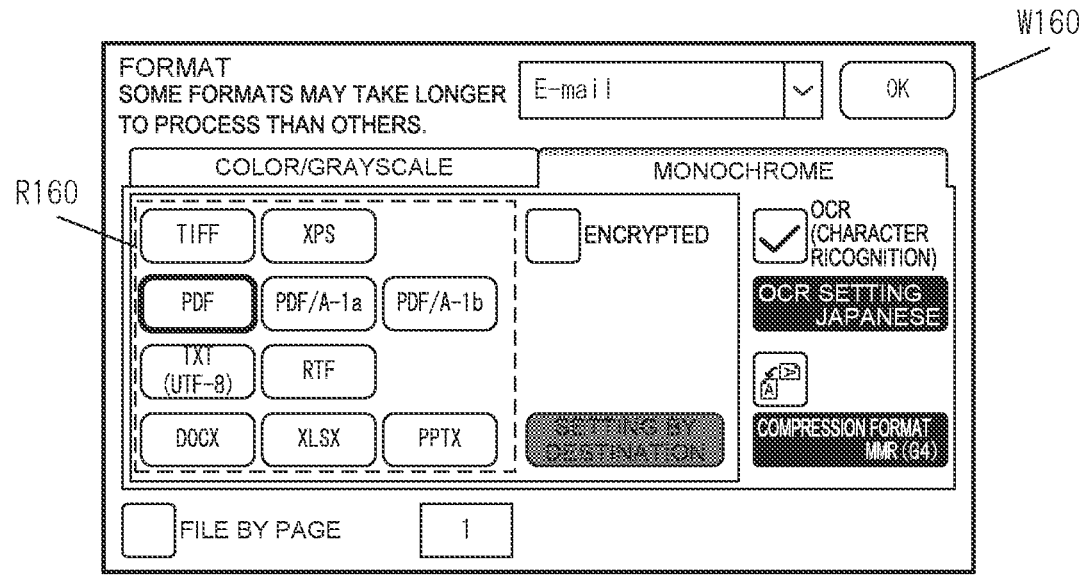

Note that, comparing the region R140 in FIG. 14B with a region R160 in FIG. 15B, a display/non-display state is appropriately switched for the required file output formats.

2. Second Embodiment

The following describes a second embodiment. The setting items and the like associated with the OCR function are not displayed in the first embodiment, but are displayed in the second embodiment although they are not selectable. Note that only points that are different from the first embodiment are described in this embodiment, and descriptions are omitted for points that are similar in functional configuration and processing.

Figure 16:
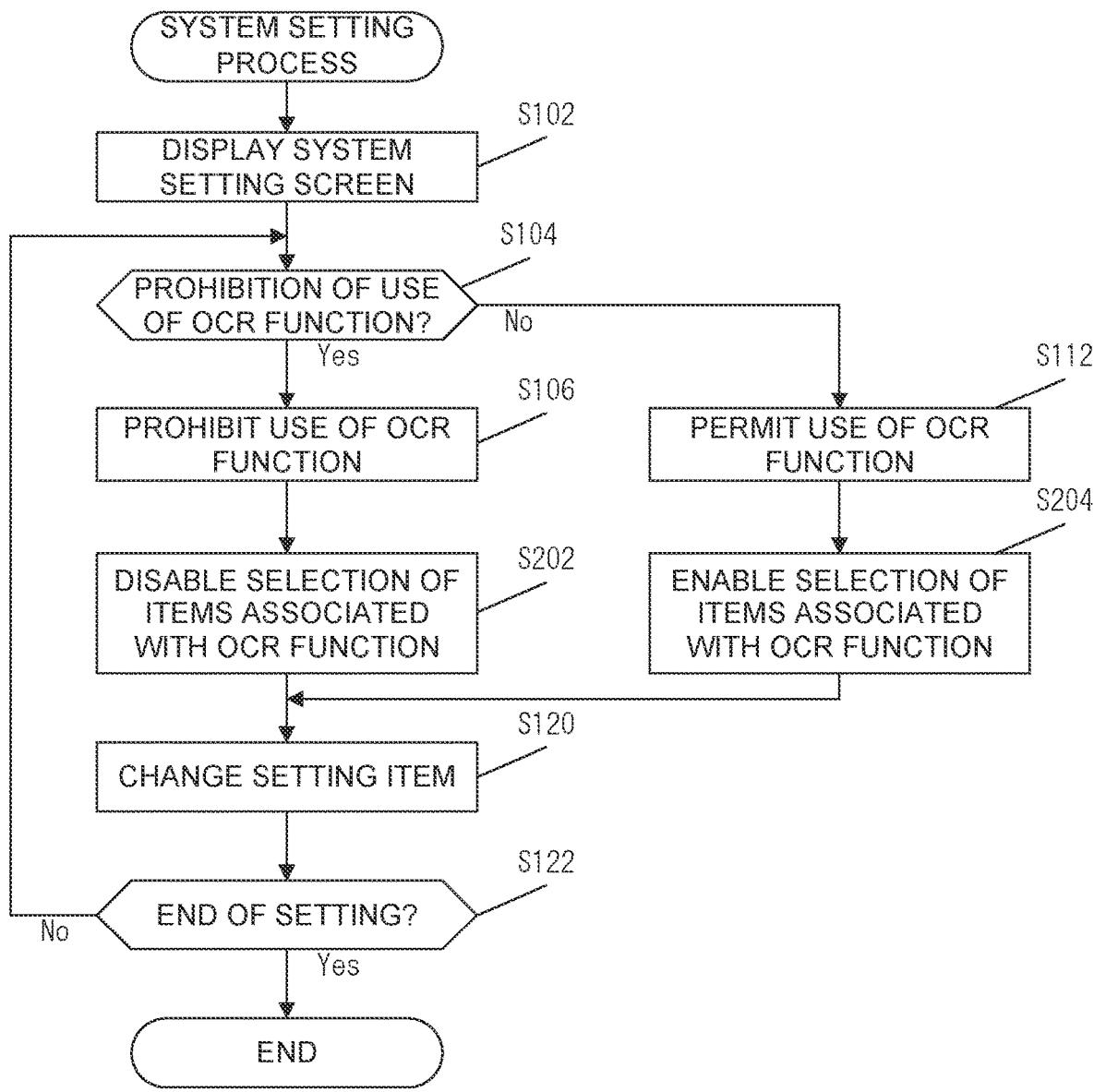
FIG. 16 is a flowchart of a process (a system setting process) according to a second embodiment.

FIG. 16 is a flowchart in which the flowchart of the first embodiment illustrated in FIG. 8 is modified. The same processes as those in the first embodiment are denoted by the same reference numerals, and descriptions thereof are omitted.

When use of an OCR function is prohibited by an administrator, a controller 100 disables selection of setting items associated with the OCR function on a system setting screen (step S202). Here, the selection disabling state means a state in which the administrator or the like may not select the setting items although the setting items are displayed. Note that the controller 100 may change a display manner of the setting items to indicate that the setting items are not selectable. For example, the controller 100 may gray out or display in a different color the setting items that are not selectable. Alternatively, the controller 100 may display indications (e.g., icon display) indicating that the items may not be selected near the setting items that are not selectable.

Figure 17:
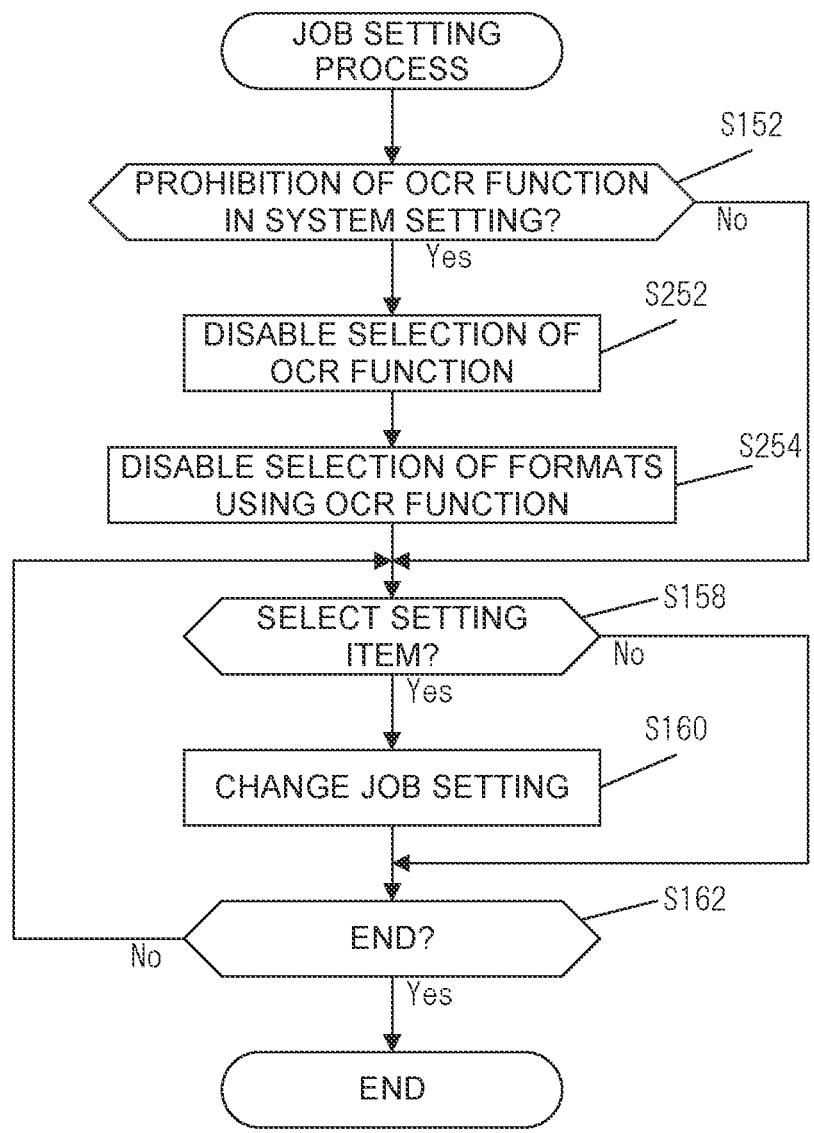
FIG. 17 is a flowchart of a process (a job setting process) according to the second embodiment.

FIG. 17 is a flowchart in which the flowchart of the first embodiment illustrated in FIG. 9 is modified. The same processes as those in the first embodiment are denoted by the same reference numerals, and descriptions thereof are omitted.

In this embodiment, when the use of the OCR function is prohibited in a system setting, the controller 100 (a job executor 1010) enables a selection of the OCR function (step S252). Furthermore, the controller 100 (the job executor 1010) disables selections of formats that use the OCR function (step S254).

FIG. 18 is a diagram illustrating a display screen W200 according to an example of a system setting screen according to this embodiment. In this embodiment, the use of the OCR function is prohibited as a common setting by the administrator in the system setting screen (e.g., the OCR function is set to be prohibited in the region R102 in FIG. 10).

Here, in each job mode, the controller 100 limits the use of the OCR function, and therefore, a check box of the OCR is not selectable as shown in a region R202. The controller 100 displays a setting item grayed out, for example, to clearly indicate that the check box of the OCR is not selectable.

Furthermore, the controller 100 performs settings of fonts to be used in a case where the OCR function is used in a setting item displayed in a region R204. However, since the use of the OCR function is prohibited in this embodiment, the controller 100 displays the setting items in the region R204 in a non-selectable state (in a grayed-out state).

In this way, in this embodiment, the setting items are displayed but not selectable. Therefore, although restricting the use of the OCR function, the administrator can check functions that can be realized by the OCR function.

Note that a list of formats of a file to be output may be not displayed for those using the OCR function, or may be displayed in a selection unavailable manner. In other words, in a case where a region R206 is selected, the controller 100 may performs display in the state shown in FIG. 13A. Furthermore, the controller 100 may perform the display in the state shown in FIG. 13B, with a special display (e.g., grayscale display, non-selectable icon display, etc.) for file output formats that may not be selected.

Figure 19A:
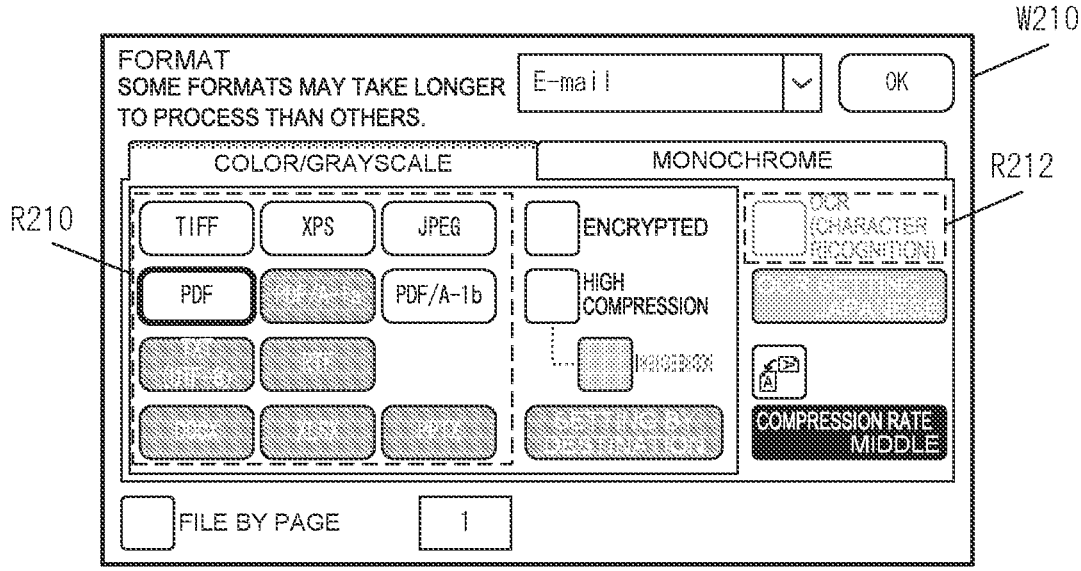
FIGS. 19A and 19B are diagrams illustrating examples of a display screen (a job setting screen) according to the second embodiment.
Figure 19B:
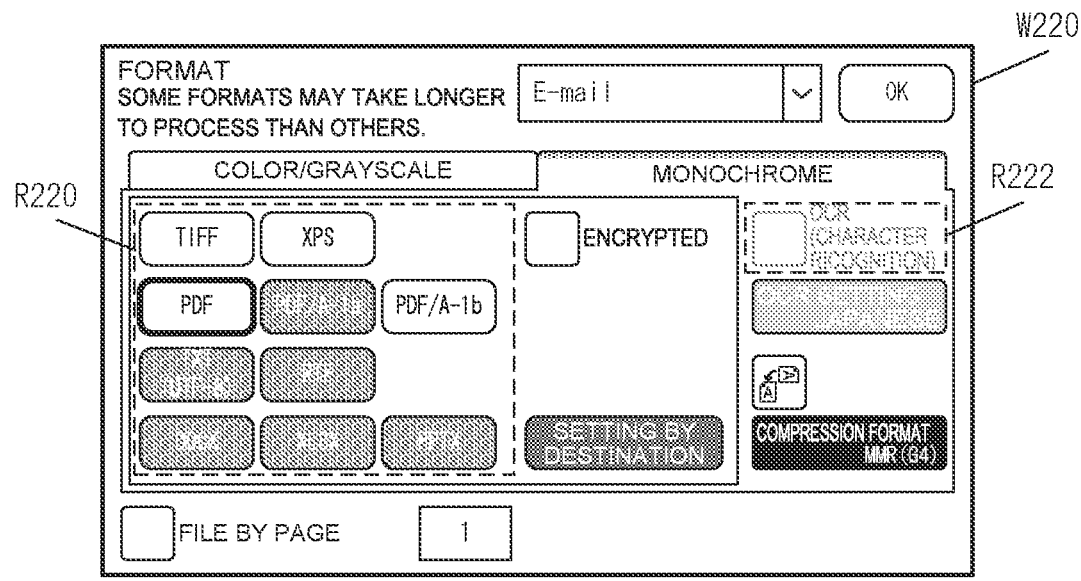

For example, FIGS. 19A and 19B illustrate display screens being examples of a job setting screen. A display screen W210 of FIG. 19A is a job setting screen in a color/grayscale mode. In a region R210, formats selectable by a user are displayed (e.g., TIFF, XPS, and the like). One of the formats (e.g., PDF) is currently selected. At this time, among the file output formats displayed in the region R210, formats which may not be selected are displayed in a special manner. For example, "RTF" and "DOCX" are not selectable formats, and therefore, the formats are grayed out. The user may not select the grayed-out formats (including "DOCX", for example).

Furthermore, character recognition is executed on a document when the user checks a region R212. In this embodiment, the use of the OCR function is prohibited in the system setting to begin with. Therefore, in the region R212, the controller 100 performs the grayed-out display so that the user may not perform selection.

A display screen W220 of FIG. 19B is a job setting screen in a monochrome mode. As in FIG. 19A, a region R220 displays formats applicable as the file output formats. Of these, formats that require the use of the OCR function are grayed out so that the formats are not selectable.

In addition, a region R222 is used to switch ON and OFF of the use of the OCR function. A display button (a check button) in the region R222 and the display itself are grayed out to clearly indicate that a selection is not available. Furthermore, the user may not select the display button in the region R222. Therefore, the use of the OCR function by the user is restricted.

3. Third Embodiment

The following describes a third embodiment. In the second embodiment, the setting items and the like associated with the OCR function are grayed out, that is, are not selectable. In the third embodiment, in a case where a grayed-out portion is selected, for example, the use of the OCR function becomes available depending on user authority. Note that only points that are different from the first and second embodiments are described in this embodiment, and descriptions are omitted for points that are similar in functional configuration and processing.

FIG. 20 is a flowchart in which the flowchart of the second embodiment illustrated in FIG. 16 is modified. The same processes as those in the first and second embodiments are denoted by the same reference numerals, and descriptions thereof are omitted.

When the user has selected a setting item (step S158; Yes), the controller 100 determines whether the selected setting item is a restricted setting item (step S352). Here, the restricted setting item is in a state in which the user may not select the item since the restriction is made in the system setting. Note that the restricted item may be displayed in an identifying manner so that the user can identify the restricted item. In this embodiment, the restricted setting item is displayed in by grayed-out display.

When a setting item restricted by the user is selected (step S352; Yes), it is determined whether authority for selecting the setting item restricted by the user has been given (step S354). For example, the controller 100 determines whether the user currently logged into the image-forming apparatus 10 has been authorized. Information indicating that the user has been authorized may be stored in a storage 110 as user information. For example, the storage 110 may store information identifying the user (e.g., a user ID) and a password as user information. Furthermore, the user information may be stored together with the user authority. As the user authority, for example, whether individual functions are available may be stored. For example, when the user is authorized to use the OCR function, the user may use the OCR function even when the OCR function is restricted by the system setting. Furthermore, the user may be associated with a group and an affiliation. For example, the user may be stored in a group, such as an administrative user group, a general user group, or a guest user group. Then, it is possible to store whether each function is available for each group and each affiliation.

Furthermore, the controller 100 may perform a login process in step S354 when the user is not logged into the system. The controller 100 may determine presence or absence of the user authority based on the logged-in user in step S354.

Furthermore, the controller 100 may also determine whether the user has user authority based on password authentication. For example, the controller 100 displays a password input screen when a restricted setting item is selected by the user. When a correct password is entered by the user, the controller 100 may determine that the user has user authority.

In addition to the password authentication, the controller 100 may use other authentication methods, such as IC card authentication or biometric authentication, to determine whether the user is authorized.

When it is determined that the user has been authorized, the controller 100 allows settings of the job to be changed and changes a job setting in response to a user operation (step S160). Accordingly, when the OCR function is restricted by the system setting, for example, the grayed-out display is performed, and the user has been authorized, the OCR function is enabled.

Note that, when the user is not authorized, the controller 100 does not change the job setting in question (step S354; No→step S162).

Figure 21A:
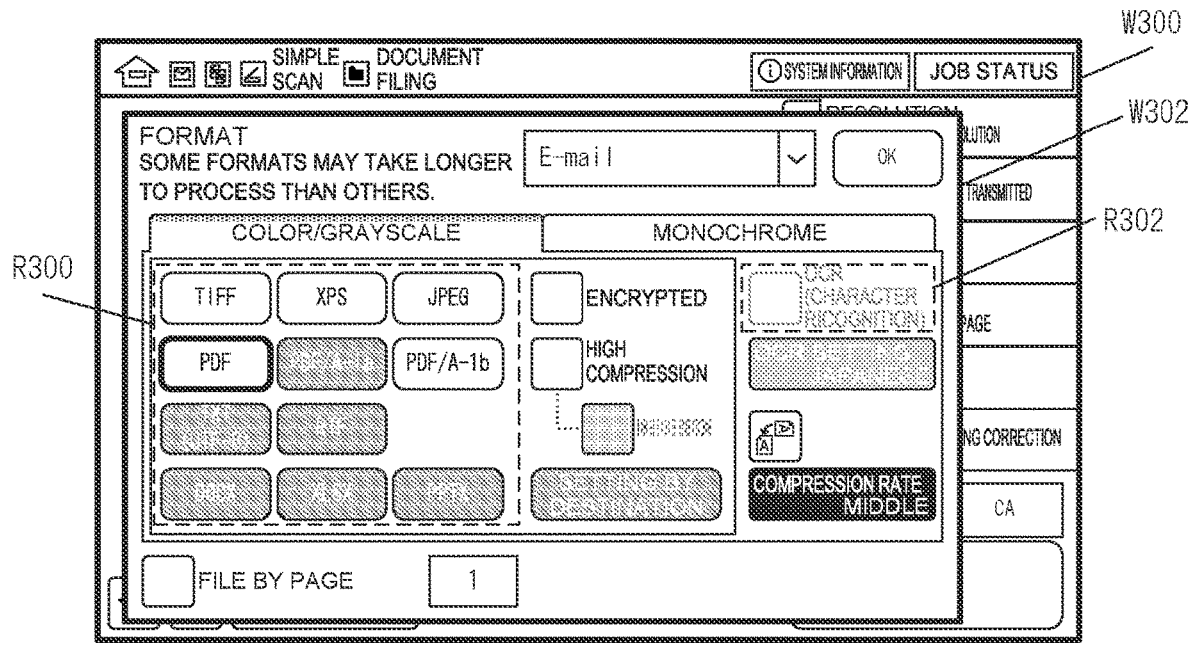
FIGS. 21A and 21B are diagrams illustrating examples of a display screen (a job setting screen) according to the third embodiment.

An operation example of this embodiment will be described with reference to drawings. FIG. 21A is a diagram illustrating a job setting screen when the use of the OCR function is restricted. The display screen W300 is an operation screen of the image-forming apparatus 10. A display screen W302 which is a job setting screen is superimposed on a display screen W300. Note that the display screen W302 may be displayed on a portion of the display 140 of the image-forming apparatus 10, as shown in FIG. 21A, or may be displayed on the entire screen.

As in the second embodiment, in the display screen W302, the OCR function is restricted by the system setting, and therefore, setting items that are not selectable are grayed out. For example, in the region R300, file formats that use the OCR function are grayed out and not selectable by the user (e.g., "PDF/A-1a," "TXT," "RTF," "DOCX," "XLSX," and "PPTX"). In addition, a button (a check button) to change the use of the OCR function is displayed in a region R302. Since the use of the OCR function is restricted (prohibited) by the current system setting, the check box and a name of a setting item are grayed out in display in the region R302.

Here, when the user selects the region R302, the controller 100 determines whether the user has user authority. Here, the controller 100 may determine whether a selection has been performed simply by a touch or the like as a user operation or determine whether an unusual operation has been performed. For example, the controller 100 may determine that the user has performed a long press, or that the user has performed double-tapping (double-touch). When the user selects the region R302, the controller 100 determines whether the selected user is authorized to use the OCR function. Note that the controller 100 may similarly determine whether the user has been authorized when grayed-out display in the region R300 is selected.

Figure 21B:
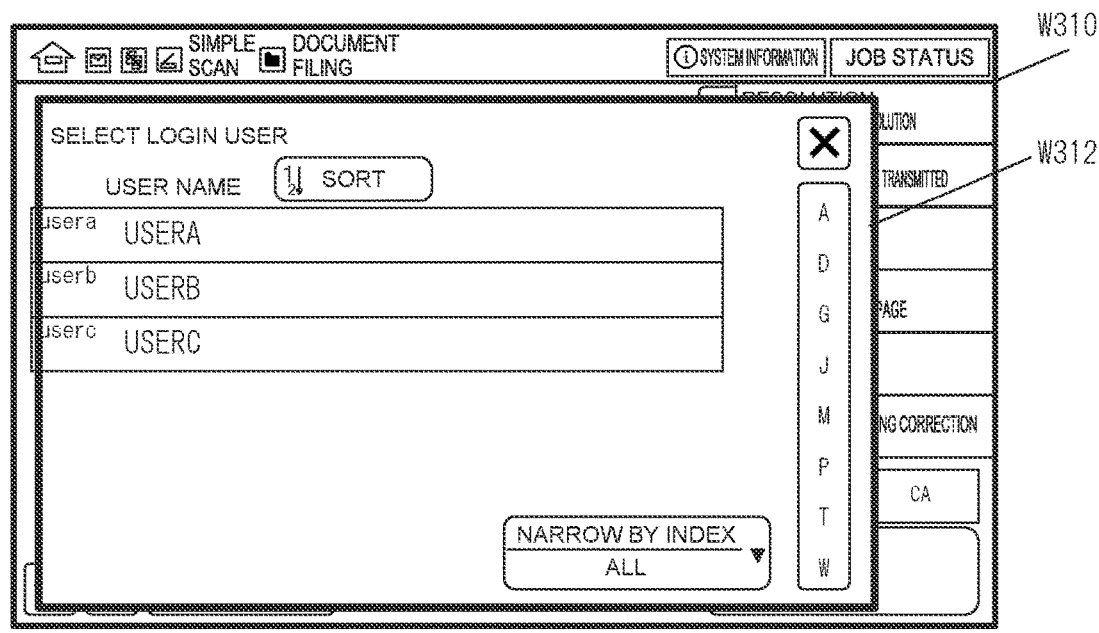

FIG. 21B is a diagram illustrating a state in which a login is performed to determine user authority. For example, a display screen W312 superimposed on a display screen W310 is a login user selection screen. Here, when a login user is selected, the controller 100 performs user authentication for the selected user.

Figure 22A:
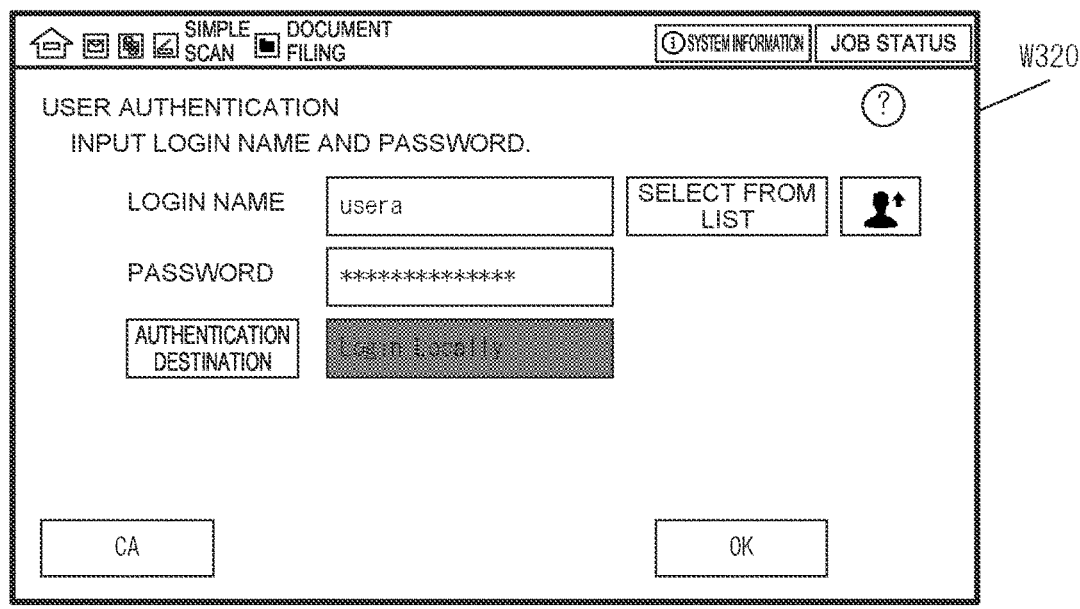
FIGS. 22A and 22B are diagrams illustrating examples of the display screen (the job setting screen) according to the third embodiment.

FIG. 22A is a diagram of a display screen W320 for performing user authentication (a login process). For example, when the user inputs a login name and a password and presses an OK button, the controller 100 performs user authentication.

Figure 22B:
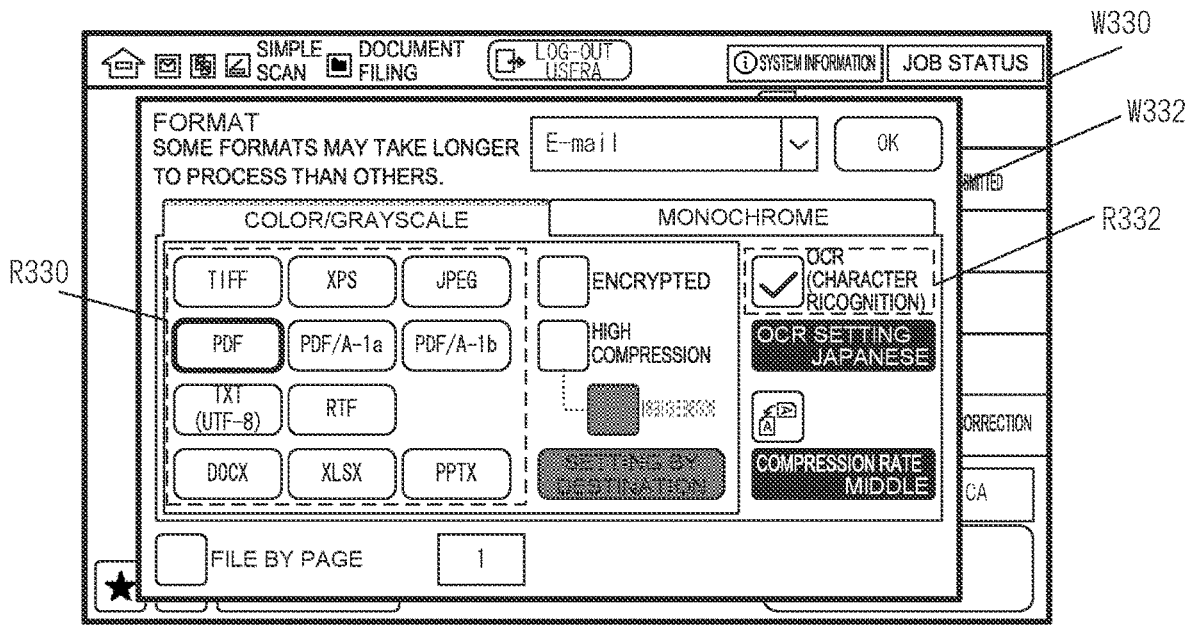

When the user authentication is properly performed, the controller 100 enables the OCR function restricted by the system setting for that user's operation. For example, FIG. 22B is a diagram illustrating a state in which a display screen W332 that is a job setting screen is displayed on a display screen W330.

In the display screen W332, the user can select formats that use the OCR function in a region R330. Furthermore, in the display screen W332, a button for changing enabling/disabling of the OCR function is displayed in a region R332. The user may enable/disable the OCR function. Furthermore, the user may output files of formats that require the use of the OCR function.

Thus, according to this embodiment, even in a case where the use of the OCR function is restricted in the system setting, a user who is authorized to user the OCR function may use the OCR function. Therefore, according to this embodiment, both security and usability can be ensured.

4. Fourth Embodiment

The following describes a fourth embodiment. In the fourth embodiment, restriction of a job setting or a change in display of setting items are not performed by UIs but it is determined whether use of an OCR function is restricted in job execution. Note that only points that are different from the first and second embodiments are described in this embodiment, and descriptions are omitted for points that are similar in functional configuration and processing.

In this embodiment, a normal job setting screen is displayed in a job setting process (step S16 in FIG. 7). Therefore, a user may enable the OCR function or select a format that requires the OCR function on the job setting screen. For example, in the fourth embodiment, the job setting screen illustrated in FIG. 15 is displayed.

Figure 23:
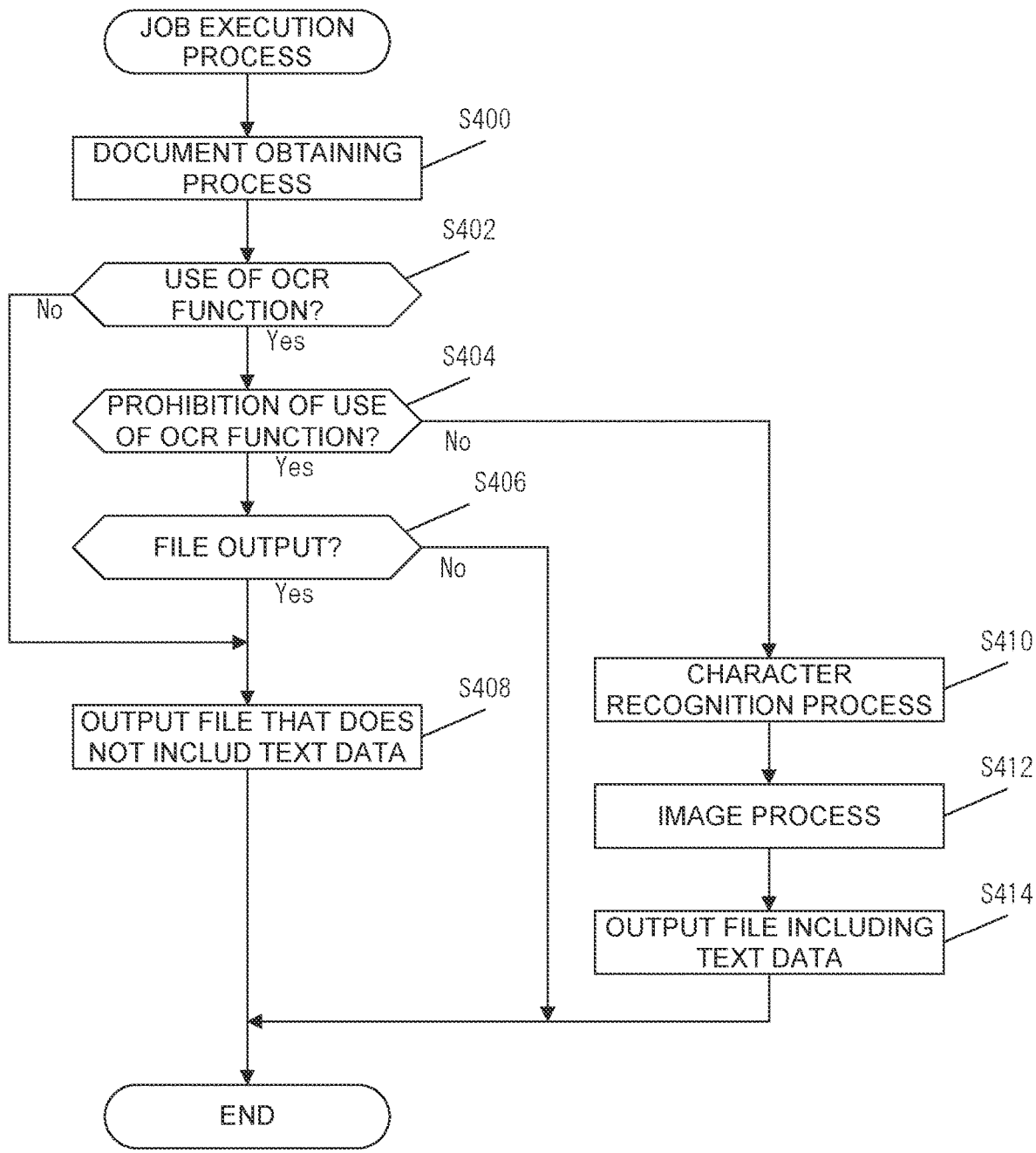
FIG. 23 is a flowchart of a process (a job execution process) according to a fourth embodiment.

Here, in this embodiment, when job execution is instructed after a job setting is completed, a job execution process is executed (step S18 in FIG. 7). Here, the job execution process of this embodiment is performed, for example, as shown in FIG. 23.

First, a controller 100 (a job executor 1010) executes a document obtaining process (step S400). For example, the controller 100 obtains a document via an image reader 162. Specifically, the controller 100 obtains an image based on a document. Furthermore, the controller 100 may obtain an image, for example, from another device (a terminal device, a smartphone, or the like) via a communicator 170 or from another recording medium (e.g., a USB memory).

The controller 100 determines whether the OCR function is to be used in accordance with a current job settings (step S402). When the OCR function is not to be used, the controller 100 outputs a file that does not include character data based on a document (an image) (step S402; No→step S408).

Here, a file that includes character data means a file that include both character data and an image. For example, in a case of a PDF file, an image of a document and character data are included. A user may be allowed to copy or edit character data included in the PDF.

Furthermore, a file including character data may be a file only including character data (text data). Moreover, the file including character data may be a file used in word processor software or the like (such as a DOCX file and an ODT file) or a file including information based on character data, such as a file used in excel software or the like (such as an XLSL file and an ODS file).

Furthermore, the file that does not include character data is generally referred to as an image file. The file that does not include character data may be a JPEG file or a BMP file, for example. Alternatively, the file that does not include character data may indicate a file including character data that is not used by the user. For example, a PDF file may include an added attribute that prohibits the user from using characters by selecting, copying, or editing, the characters.

When the user has selected use of the OCR function in step S402, the controller 100 determines whether the use of the OCR function is restricted in the system settings (step S404). Here, when the use of the OCR function is not restricted, the controller 100 (a character recognizer 1012) executes a character recognition process and outputs character data based on the document (the image). The controller 100 (an image processor 1014) also performs image processing where appropriate (step S412).

The controller 100 (an image outputter 1016) then outputs the file including the character data (step S414).

Furthermore, in step S404, when the use of the OCR function is restricted (prohibited) in the system setting, the controller 100 determines whether the file is to be output. For example, as an example of the output of a file, when an alternative format is set, the controller 100 selects the alternative format and outputs a file that does not include character data in the alternative format (step S406; Yes→step S408). Note that the controller 100 may output a message to the user at this time. Furthermore, the controller 100 may cause the user to select the alternative format.

When it is set to that files are not output, the controller 100 terminates the process without outputting any file (step S406; No). At this time, the controller 100 preferably displays an error message to the user.

Figure 24:
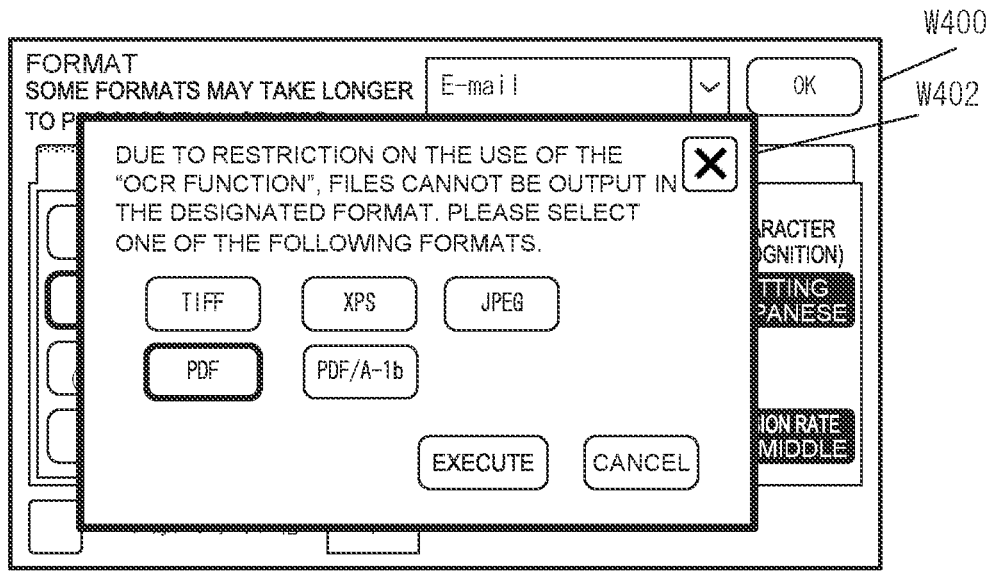
FIG. 24 is a diagram illustrating an example of a display screen according to the fourth embodiment.

FIG. 24 is an example of a display screen W400 output in step S406 according to this embodiment. The display screen W400 displays a display screen W402 that allows the user to select a format of the file to be output. The user can output a file that does not use the OCR function by selecting one of formats displayed in the display screen W402.

Thus, according to this embodiment, even in a case where the display of the job setting screen is not controlled based on content of the system setting (prohibition of the OCR), processing in accordance with the content of the system setting may be realized by determining whether the use of the OCR function is restricted when a job that uses the OCR function is executed.

5. Fifth Embodiment

The following describes a fifth embodiment. In the fifth embodiment, restriction on an OCR function is set in accordance with user authority when user authentication is enabled. Note that processing may be realized in the fifth embodiment by combining the first to fourth embodiments described above.

For example, user information is stored in a storage 110. The user information includes, as described in the third embodiment, at least information required for user authentication (a login name, a password, and the like) and the user authority, as described in the third embodiment.

The user authority may include information on whether each user is allowed to use the OCR function. Furthermore, the user authority may be set by group or by attribute, rather than by each user. Moreover, the user authority may be stored by mode as well as information on whether the OCR function can be used as a whole. For example, the controller 100 may set and store in the user information that the user may not use the OCR function in an E-mail mode but can use the OCR function in a shared folder mode.

Then an operation of the user may be combined with the embodiments described above. For example, when use of the OCR function is permitted in the system setting, all users may use the OCR function.

Furthermore, when the use of the OCR function by the user (including a group and a user (including groups and attributes) is restricted (prohibited) from using the OCR function in the system setting, the controller 100 may restrict the user operation as follows.

(1) The user who is prohibited from using the OCR function sets setting items for using the OCR function to be not displayed in the UI. In this case, for example, the method described in the first embodiment is used.

(2) The user who is prohibited from using the OCR function sets setting items for using the OCR function to be not selected in the UI. In this case, for example, the methods described in the second and third embodiments are used.

(3) The user who is prohibited from using the OCR function disables the use of the OCR function in job execution. In this case, for example, the method described in the fourth embodiment is used.

In this way, according to this embodiment, the methods in the embodiments described above can be set for each user. Furthermore, the methods in the embodiments described above can be set by group or by attribute.

6. Sixth Embodiment

The following describes a sixth embodiment. The case where the specific function is the OCR function has been described in the foregoing embodiments. Specifically, when the use of a specific function is prohibited on a system setting screen, setting items associated with the specific function may not be selected on the system setting screen or the setting items that use the specific function may not be selected on the job setting screen.

In this embodiment, a case where another function is applied as the specific function will be described. For example, a stapling function is taken as an example of the specific function. The stapling function is used in a case where an image-forming apparatus 10 binds paper using staples.

For example, in step S104 of FIG. 8, it is determined whether the stapling function (using staples) is prohibited instead of the OCR function. When the stapling function is prohibited, the controller 100 does not display setting items associated with the stapling function.

For example, setting items, such as saddle-stitch printing and a binding function, may not be displayed in a system setting screen (step S108).

Furthermore, in the job setting process, the setting items that use the stapling function may not be displayed in a job setting screen. For example, in step S154 of FIG. 9, functions that use staples, such as a saddle-stitch printing button, a binding printing button, and a stapling button, may not be displayed.

Note that, as described in the second embodiment, instead of non-display of the setting items, the setting items may be grayed out and displayed as not selectable. Furthermore, as in the third embodiment, processing associated with the specific function may be restricted during job execution.

Thus, according to this embodiment, the selection of the setting items associated with the specific function may be disabled on the system setting screen or on the job setting screen.

Furthermore, the specific function may be a color printing function, a manual feeding printing function, or the like.

7. Modification

The present disclosure is not limited to the embodiments described above, and various modifications may be made.

That is, the technical scope of the present disclosure also includes embodiments that may be obtained by combining technical measures that are modified as appropriate without departing from the gist of the present disclosure.

Further, although the above-described embodiments are separately described for convenience of explanation, the embodiments may be implemented in combination within a technically possible range. Furthermore, the applicant has the intention of acquiring rights to any of the technologies described in the specification in an amendment or divisional application, etc.

In addition, the programs operated on the devices in the embodiments control the CPU or the like (i.e., programs which make a computer function) so as to implement the functions of the above-described embodiments. Moreover, information handled by these devices is temporarily stored in a temporary storage device (for example, a RAM) when being processed, and then stored in various storage devices such as a ROM and an HDD, where the information is read, corrected, and written by the CPU as needed.

Here, as the recording medium for storing the programs, a semiconductor medium (for example, a ROM, a non-volatile memory card, etc.), an optical recording medium/magneto-optical recording medium (for example, a DVD (Digital Versatile Disc), a CD (Compact Disc), a BD (Blu-ray Disk), etc.), a magnetic recording medium (for example, a magnetic tape, a flexible disk, etc.) or the like may be used.

Furthermore, in a case where the programs are to be distributed to the market, the programs may be stored in a portable recording medium for distribution or transferred to a server computer connected via a network, such as the Internet. In this case, a storage device of the server apparatus is also included in the present disclosure as a matter of course.

Furthermore, the data described above is not stored in the device, but may be stored in an external device and called as appropriate. For example, data may be stored on a NAS (Network Attached Storage) or in the cloud.

Note that the scope of this disclosure is not limited to the configurations explicitly described in the specification, but includes any combination of the technologies disclosed herein. Although the present disclosure includes the configuration to be patented in the appended claims, it is not the intention to exclude configurations from the technical scope on the grounds that the configurations are not recited in the claims.

In addition, the descriptions "in a/the case of/where" and "when (a time)" in the specification are explained as examples, and the configuration is not limited to the described contents. As for configurations other than such cases and such times, the scope that would be obvious to a person skilled in the art is also disclosed, and the intention is to acquire the right.

In addition, the descriptions of the processes and the flows of data described in the specification with order are not limited to the order in which they are described. For example, the configuration in which a portion of the process is removed or the configuration in which the order is changed are disclosed, and the applicants has an intention to acquire the rights.

What is claimed is:

1. An image output apparatus, comprising:
   a controller that controls display of a first setting screen including setting items of a system to be used for a setting of operation of the image output apparatus and a second setting screen including setting items of a job to be used in a setting of operation in job execution; and
   an image outputter that outputs an image by executing a job based on the setting of the operation in the job execution, wherein
   the controller disables a selection of the setting items of the job that uses a specific function on the second setting screen when use of the specific function is prohibited on the first setting screen.

2. The image output apparatus according to claim 1, wherein the controller disables a selection of the setting items of the system associated with the specific function on the first setting screen when use of the specific function is prohibited on the first setting screen.

3. The image output apparatus according to claim 1, wherein the controller does not display the setting items.

4. The image output apparatus according to claim 1, wherein the controller displays the setting items by changing a display manner thereof.

5. The image output apparatus according to claim 1, wherein
   the specific function is a character recognition function, and
   when prohibiting use of the character recognition function on the first setting screen, the controller disables a selection of use of the character recognition function and/or disables a selection of a format of an image using the character recognition function on the second setting screen.

6. The image output apparatus according to claim 5, wherein the image outputter outputs an image including character data output as a result of execution of the character recognition function.

7. The image output apparatus according to claim 5, wherein
   a setting associated with character data to be output is included in the setting items of the system, and
   when prohibiting use of the character recognition function on the first setting screen, the controller disables a selection of a setting associated with the character data to be output on the first setting screen.

8. The image output apparatus according to claim 1, wherein the controller
   executes authentication when a setting item that is not available for a selection is selected on the second setting screen, and
   enables a selection of the setting item that is not available for a selection when the authentication is successfully performed.

9. The image output apparatus according to claim 8, wherein the controller enables the selection of the setting item when a user is confirmed to have authority for use of the specific function by the authentication.

10. An image output method, comprising:
   displaying a first setting screen including setting items of a system to be used for a setting of operation of the image output apparatus and a second setting screen including setting items of a job to be used in a setting of operation in job execution; and
   outputting an image by executing a job based on the setting of the operation in the job execution, wherein
   a selection of the setting items of the job that uses a specific function is disabled on the second setting screen when use of the specific function is prohibited on the first setting screen.

* * * * *